US012780989B2

(12) United States Patent
Ebert et al.

(10) Patent No.: US 12,780,989 B2
(45) Date of Patent: Nov. 3, 2026

(54) BIODEGRADABLE GRAFT POLYMERS

(71) Applicant: The Procter & Gamble Company, Cincinnati, OH (US)

(72) Inventors: Sophia Ebert, Mannheim (DE); Susanne Carina Engert, Ludwigshafen (DE); Ouidad Benlahmar, Ludwigshafen (DE); Gang Si, Newcastle upon Tyne (GB); Frank Huelskoetter, Schwalbach am Taunus (DE); Katarzyna Gorczynska-Costello, Newcastle upon Tyne (GB); Pieter Jan Maria Saveyn, Strombeek-Bever (BE); Natalia Stergiopoulou, Strombeek-Bever (BE); Jean-Pol Boutique, Strombeek-Bever (BE); Jef Annie Alfons Maes, Strombeek-Bever (BE); Natalia Becker, Sandhausen (DE); Andreas Buechse, Hochspeyer (DE)

(73) Assignee: The Procter & Gamble Company, Cincinnati, OH (US)

( * ) Notice: Subject to any disclaimer, the term of this patent is extended or adjusted under 35 U.S.C. 154(b) by 991 days.

(21) Appl. No.: 17/891,234

(22) Filed: Aug. 19, 2022

(65) Prior Publication Data

US 2022/0403107 A1 Dec. 22, 2022

Related U.S. Application Data

(63) Continuation of application No. PCT/EP2021/054199, filed on Feb. 19, 2021.

(30) Foreign Application Priority Data

Feb. 21, 2020 (EP) .................................... 20158733

(51) Int. Cl.

| | |
|---|---|
| ***C08G 73/02*** | (2006.01) |
| ***C08G 63/685*** | (2006.01) |
| ***C08G 65/26*** | (2006.01) |
| ***C11D 3/37*** | (2006.01) |

(52) U.S. Cl.
CPC ......... *C08G 73/024* (2013.01); *C08G 63/685* (2013.01); *C08G 63/6852* (2013.01); *C08G 65/2624* (2013.01); *C11D 3/3723* (2013.01); *C08G 2230/00* (2013.01)

(58) Field of Classification Search
CPC ....... C08G 73/024; C08G 73/02; C11D 3/372
See application file for complete search history.

(56) References Cited

U.S. PATENT DOCUMENTS

| | | | | |
|---|---|---|---|---|
| 4,960,540 | A | 10/1990 | Friel, Jr. et al. | |
| 6,156,720 | A * | 12/2000 | Boeckh | C11D 3/0036 510/475 |
| 6,710,023 | B1 * | 3/2004 | Bodet | C11D 1/83 510/237 |
| 8,318,653 | B2 | 11/2012 | Misske | |
| 9,486,416 | B2 | 11/2016 | Winchester et al. | |
| 9,738,754 | B2 | 8/2017 | Ebert et al. | |
| 2012/0059088 | A1 | 3/2012 | Hilfiger et al. | |
| 2013/0231418 | A1 | 9/2013 | Hilfiger et al. | |
| 2015/0122742 | A1 | 5/2015 | Hilfiger et al. | |
| 2016/0222160 | A1 * | 8/2016 | Ebert | C08G 65/3344 |
| 2016/0289584 | A1 * | 10/2016 | Russo | C10L 10/04 |

FOREIGN PATENT DOCUMENTS

| | | | | | |
|---|---|---|---|---|---|
| JP | H0370727 | B2 | 3/1991 | | |
| JP | H0370734 | A | 3/1991 | | |
| JP | H1143538 | A | 2/1999 | | |
| WO | WO-9815608 | A2 * | 4/1998 | C11D 3/3715 | |

OTHER PUBLICATIONS

CM05315Q PCT Search Report and Written Opinion for PCT/EP2021/054199 dated Mar. 17, 2021, 11 pages.

* cited by examiner

*Primary Examiner* — Gregory Listvoyb
(74) *Attorney, Agent, or Firm* — Abigail O. Idokogi; Andrew J. Mueller

(57) ABSTRACT

An alkoxylated polyamine can include the general formula (I)

(I)

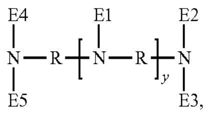

in which the variables E1 to E5, R and y are defined as disclosed in the description.

10 Claims, No Drawings

BIODEGRADABLE GRAFT POLYMERS

FIELD OF THE INVENTION

Novel alkoxylated polyamines are described herein, as well as methods of making such materials.

BACKGROUND OF THE INVENTION

Various states have already introduced initiatives to ban microplastics especially in cosmetic products. Beyond this ban of insoluble microplastic there is an intense dialog on future requirements for soluble polymers used in consumer products. It is therefore highly desirable to identify new and better biodegradable ingredients for such applications. As such, there is a need for polymers as described herein which can have enhanced biodegradation properties.

SUMMARY OF THE INVENTION

Included herein for example, is an alkoxylated polyamine of the general formula (I)

(I)

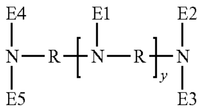

in which the variables are each defined as follows: R represents identical or different, linear or branched $C_2$-$C_{12}$-alkylene radicals or an etheralkyl unit of the following formula (III):

(III)

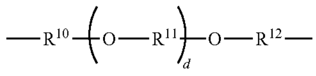

in which the variables are each defined as follows: $R^{10}$, $R^{11}$, $R^{12}$ represent identical or different, linear or branched $C_2$-$C_6$-alkylene radicals and d is an integer having a value in the range of 0 to 50; or a cyclic alkylene-structure of $C_5$ to $C_8$, preferably $C_5$ to $C_6$, more preferably $C_6$-alkylene, optionally bearing 0 to 3, preferably 0 or 2, more preferably 0 or 1, most preferably 1, $C_1$ to $C_3$-alky, preferably methyl-group(s) at the cyclic alkyl-structure, with the amine-groups being directly attached to the cyclic structure or linked via a further methylene-group, y is an integer having a value in the range of 0 to 3, preferably 0 to 2, more preferred 0 or 1, and most preferred 0; and wherein y=0 when R is a cyclic alkylene, E1, E2 and E4 represent an identical or different residue according to formula (IIa) or an identical or different residue according to formula (IIb), wherein the residue according to formula (IIa) is an alkylenoxy unit defined as follows (IIa)

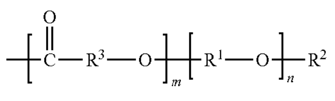

in which the variables are each defined as follows: $R^1$ represents $C_2$-$C_{22}$-(1,2-alkylene) radicals; $R^2$ represents hydrogen and/or $C_1$-$C_{10}$-alkyl and/or $C_7$-$C_{10}$-aralkyl, preferably H and/or $C_1$-$C_{10}$-alkyl, more preferably H and/or $C_1$-$C_3$-alkyl, even more preferably H and/or $C_1$-$C_4$-alkyl, most preferably H; $R^3$ represents linear or branched $C_1$-$C_{22}$-alkylene radicals; m is an integer having a value of at least 1 to 10; n is an integer having a value of at least 5 to 100; and wherein $R^1$ is derived from at least 50 wt % $C_3$ and/or $C_4$ 1,2-alkylene radicals, and wherein the residue according to formula (IIb) is an alkylenoxy unit defined as follows (IIb)

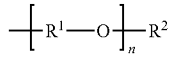

in which the variables are defined as follows: $R^1$ represents $C_2$-$C_{22}$-1,2-alkylene radicals; $R^2$ represents hydrogen and/or $C_1$-$C_{10}$-alkyl and/or $C_7$-$C_{10}$-aralkyl, preferably H and/or $C_1$-$C_{10}$-alkyl, more preferably H and/or $C_1$-$C_3$-alkyl, even more preferably H and/or $C_1$-$C_4$-alkyl, most preferably H; n is an integer having a value of at least 5 to 100; and wherein $R^1$ is derived from at least 50 wt % $C_3$ and/or $C_4$ 1,2-alkylene radicals, E3 is hydrogen in case E2 is a residue according to formula (IIa) or E3 is a residue according to formula (IIb); E5 is hydrogen in case E4 is a residue according to formula (IIa) or E5 is a residue according to formula (IIb); and/or wherein 5 to 100% of the total amount of E2 and E4 is a residue according to formula (IIa) and 50 to 100% of the total amount of E1 is a residue according to formula (IIb).

This an other embodiments will be more fully described in the detailed description below.

DETAILED DESCRIPTION

The present application relates to an alkoxylated polyamine according to the general formula (I)

(I)

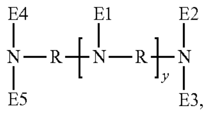

in which the variables E1 to E5, R and y are defined below.

The present application further relates to a process for preparing such alkoxylated polyamines as well as to the use of such compounds within, for example, cleaning compositions and/or in fabric and home care products. Furthermore, the present application also relates to those compositions or products as such.

An object of the present invention is to provide novel compounds based on a polyamine backbone which can have beneficial properties with respect to their biodegradability.

The main object can be achieved by an alkoxylated polyamine of the general formula (I)

(I)

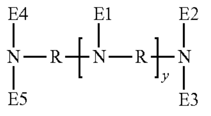

in which the variables are each defined as follows:

R represents identical or different, linear or branched $C_2$-$C_{12}$-alkylene radicals or an etheralkyl unit of the following formula (III):

$$—R^{10}—(O—R^{11})_d—O—R^{12}— \quad \text{(III)}$$

in which the variables are each defined as follows:

$R^{10}$, $R^{11}$, $R^{12}$ represent identical or different, linear or branched $C_2$-$C_6$-alkylene radicals and d is an integer having a value in the range of 0 to 50;

or a cyclic alkylene-structure of $C_5$ to $C_8$, preferably $C_5$ to $C_6$, more preferably $C_6$-alkylene, optionally bearing 0 to 3, preferably 0 or 2, more preferably 0 or 1, most preferably 1, $C_1$ to $C_3$-alky, preferably methyl-group(s) at the cyclic alkyl-structure, with the amine-groups being directly attached to the cyclic structure or linked via a further methylene-group, y are each an integer having a value in the range of 0 to 3, preferably 0 to 2, more preferred 0 or 1, and most preferred 0; and wherein y=0 when R is a cyclic alkylene, E1, E2 and E4 represent an identical or different residue according to formula (IIa) or an identical or different residue according to formula (IIb), wherein the residue according to formula (IIa) is an alkylenoxy unit defined as follows

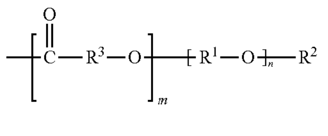

(IIa)

in which the variables are each defined as follows:

$R^1$ represents $C_2$-$C_{22}$-(1,2-alkylene) radicals;

$R^2$ represents hydrogen and/or $C_1$-$C_{10}$-alkyl and/or $C_7$-$C_{10}$-aralkyl, preferably H and/or $C_1$-$C_{10}$-alkyl, more preferably H and/or $C_1$-$C_3$-alkyl, even more preferably H and/or $C_1$-$C_4$-alkyl, most preferably H;

$R^3$ represents linear or branched $C_1$-$C_{22}$-alkylene radicals;

m is an integer having a value of at least 1 to 10;

n is an integer having a value of at least 5 to 100;

and wherein $R^1$ is derived from at least 50 wt % $C_3$ and/or $C_4$ 1,2-alkylene radicals.

and wherein the residue according to formula (IIb) is an alkylenoxy unit defined as follows $$—[R1—O]_n—R^2 \quad \text{(IIb)}$$

in which the variables are defined as follows:

$R^1$ represents $C_2$-$C_{22}$-1,2-alkylene radicals;

$R^2$ represents hydrogen and/or $C_1$-$C_{10}$-alkyl and/or $C_7$-$C_{10}$-aralkyl, preferably H and/or $C_1$-$C_{10}$-alkyl, more preferably H and/or $C_1$-$C_3$-alkyl, even more preferably H and/or $C_1$-$C_4$-alkyl, most preferably H;

n is an integer having a value of at least 5 to 100;

and wherein $R^1$ is derived from at least 50 wt % $C_3$ and/or $C_4$ 1,2-alkylene radicals.

E3 is hydrogen in case E2 is a residue according to formula (IIa) or E3 is a residue according to formula (IIb);

E5 is hydrogen in case E4 is a residue according to formula (IIa) or E5 is a residue according to formula (IIb);

wherein 5 to 100%, preferably 20 to 100%, of the total amount of E2 and E4 is a residue according to formula (IIa) and 50 to 100% of the total amount of E1 is a residue according to formula (IIb).

The alkoxylated compounds may be used in cleaning compositions. They lead to at least comparable and preferably even improved cleaning performance of said composition, for example in respect of removing stains, compared to corresponding alkoxylated compounds according to the prior art. Beyond that, the alkoxylated compounds can lead to an improved biodegradability when being employed within compositions, for example, within cleaning compositions.

For the purposes herein, definitions such as $C_1$-$C_{22}$-alkyl, as defined above for, for example, the radical $R^2$ in formula (IIa), mean that this substituent (radical) is an alkyl radical having from 1 to 22 carbon atoms. The alkyl radical can be either linear or branched or optionally cyclic. Alkyl radicals which have both a cyclic component and a linear component likewise come within this definition. The same applies to other alkyl radicals such as a $C_1$-$C_4$-alkyl radical. Examples of alkyl radicals are methyl, ethyl, n-propyl, sec-propyl, n-butyl, sec-butyl, isobutyl, 2-ethylhexyl, tert-butyl (tert-Bu/t-Bu), pentyl, hexyl, heptyl, cyclohexyl, octyl, nonyl, decyl or dodecyl.

The term "$C_2$-$C_{12}$-alkylene" as used herein refers to a saturated, divalent straight chain or branched hydrocarbon chains of 2, 3, 4, 5, 6 or up to 12 carbon groups, examples including ethane-1,2-diyl ("ethylene"), propane-1,3-diyl, propane-1,2-diyl, 2-methylpropane-1,2diyl, 2,2dimethyl-propane-1,3-diyl, butane-1,4-diyl, butane-1,3-diyl (=1methylpropane-1,3diyl), butane-1,2-diyl ("1,2-butylene"), butane-2,3-diyl, 2-methyl-butan-1,3-diyl, 3-methyl-butan-1,3diyl (=1,1dimethylpropane-1,3-diyl), pentane-1,4-diyl, pentane-1,5-diyl, pentane-2,5-diyl, 2-methylpentane-2,5-diyl (=1,1-dimethylbutane-1,3-diyl) and hexane-1,6diyl. As the cyclic alkylene-structure a C5 to C8-alkylene-ring-structure, preferably a C5 to C6-ring, more preferably a C6-alkylene ring is chosen, optionally bearing 0 to 3, preferably 0 or 2, more preferably 0 or 1, most preferably 1, C1- to C3-alky, preferably methyl-group(s), at the cyclic alkyl-structure, and with the amine-groups of formula (I) being directly attached to the cyclic structure or linked via a further methylene-group; when R is a cyclic structure, then y is an integer having the value 0. Examples of such cyclic structures are methyl-cyclohexane-diamine, such as 1-methyl cyclohexane-2,4-diamine, 2-methyl cyclohexane-1,3-diamine, and the mixtures of 1-methyl cyclohexane-2,4-diamine, 2-methyl cyclohexane-1,3-diamine, preferably in a ratio of 95:5 to 75:25, such as 85:15, 80:20, 90:10, most preferably about 85:15; other cyclic compound structures exhibiting a further methylene-group to which an amine-group of formula (I) is being attached are compounds such as 3-(aminomethyl)-3,5,5-trimethylcyclohexane-1-amine—which is a preferred cyclic amine, and the like.

For the purposes herein, the term "aralkyl", as defined above for, for example, the radical $R^2$ in formula (IIa), means that the substituent (radical) is an aromatic ("ar") combined with an alkyl substituent ("alkyl"). The aromatic "ar" part can be a monocyclic, bicyclic or optionally polycyclic aromatic. In the case of polycyclic aromatics, individual rings can optionally be fully or partially saturated. Preferred examples of aryl are phenyl, naphthyl or anthracyl, in particular phenyl.

"Polyamines" are (predominantly) linear compounds in respect of its backbone (without consideration of any alkoxylation), containing primary and/or secondary amino moieties but no tertiary amino moieties within its backbone, or cyclic compounds bearing two or more amine-groups, preferably primary amine-groups.

For further clarification purpose the following definitions and terms have the following meaning:

When e.g. "C4-1,2-alkylene radicals" is used, this is intended to mean the same as "$C_4$ 1,2-alkylene radicals" and "$C_4$ 1,2-alkylene" and "C4-1,2-alkylene", and similar for any other word used instead of "alkylene" in such phrases.

Also, e.g. "C1-C8-alkyl" is used this is intended to mean the same as "C1-C8 alkyl" and similar for any other word used instead of "alkyl" in such phrases.

Further, the wording "and/or" linking certain features—for explanative reasons defined here as "A" and "B"—is intended to mean the following: "A and/or B" encompasses all three possibilities "A, B and (A plus B)", whatever those features A and B are in the actual context of this description and examples and claims; in case of "A, B and/or C" obviously all permutations are meant to be included, i.e. A+B, A+C, B+C, A+B+C; for more than three features of course the same rational applies.

In order to obtain the respective alkoxylated compounds, the hydrogen atoms of the primary and/or secondary amino groups of the basic polyamine skeleton are replaced by alkylenoxy units of the formula (IIa) or (IIb) as defined below. In case E2 or E4 is defined according to general formula (IIa), the respective corresponding hydrogen atom of the primary amino function of the backbone (E3 or E5) stays unamended due to the formulation of an amido group.

The term "polyamine backbone" relates to those fragments of the inventive alkoxylated polyamines which are not alkoxylated. The polyamine backbone is employed within the present invention as an educt to be reacted first with at least one lactone or hydroxy carbon acid and then alkoxylated with at least one epoxide in order to obtain the inventive alkoxylated polyamines ("alkoxylated compounds"). Polyamines as such (backbones or not alkoxylated compounds) are known to a person skilled in the art. For example, the polyamine backbone can be derived from the compounds according to general formula (I) by replacing the variable E1 to E5 with hydrogen atoms (H).

The term "NH-functionality" is defined as follows: In case of (predominantly) linear amines, such as di- and oligo amines like N4 amine or hexamethylene diamine, the structure itself gives information about the content of primary, secondary and tertiary amines. A primary amino group (—NH2) has two NH-functionalities, a secondary amino group only one NH functionality, and a tertiary amino group, by consequence, has no reactive NH functionality. The exact distribution of primary, secondary and tertiary amino groups can be determined as described in Lukovkin G. M., Pshezhetsky V. S., Murtazaeva G. A.: *Europ. Polymer Journal* 1973, 9, 559-565 and St. Pierre T., Geckle M.: *ACS Polym. Prep.* 1981, 22, 128-129.

The application relates to an alkoxylated polyamine of the general formula (I)

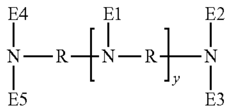

(I)

in which the variables are each defined as follows:

R represents identical or different, linear or branched $C_2$-$C_{12}$alkylene radicals
or
an etheralkyl unit of the following formula (III):

$$—R^{10}—(O—R^{11})_d—O—R^{12}— \quad (III)$$

in which the variables are each defined as follows:

$R^{10}$, $R^{11}$, $R^{12}$ represent identical or different, linear or branched $C_2$-$C_6$-alkylene radicals and
d is an integer having a value in the range of 0 to 50;
or
a cyclic alkylene-structure of $C_5$ to $C_8$, preferably $C_5$ to $C_6$, more preferably $C_6$-alkylene, optionally bearing 0 to 3, preferably 0 or 2, more preferably 0 or 1, most preferably 1, $C_1$ to $C_3$-alky, preferably methyl-group(s) at the cyclic alkyl-structure, with the amine-groups being directly attached to the cyclic structure or linked via a further methylene-group, y are each an integer having a value in the range of 0 to 3, preferably 0 to 2, more preferred 0 or 1, and most preferred 0; and wherein y=0 when R is a cyclic alkylene, E1, E2 and E4 represent an identical or different residue according to formula (IIa) or an identical or different residue according to formula (IIb), wherein the residue according to formula (IIa) is an alkylenoxy unit defined as follows

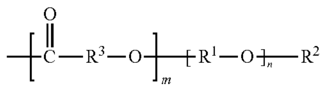

(IIa)

in which the variables are each defined as follows:

$R^1$ represents $C_2$-$C_{22}$-(1,2-alkylene) radicals;
$R^2$ represents hydrogen and/or $C_1$-$C_{10}$-alkyl and/or $C_7$-$C_{10}$-aralkyl, preferably H and/or $C_1$-$C_{10}$-alkyl, more preferably H and/or $C_1$-$C_3$-alkyl, even more preferably H and/or $C_1$-$C_4$-alkyl, most preferably H;
$R^3$ represents linear or branched $C_1$-$C_{22}$-alkylene radicals;
m is an integer having a value of at least 1 to 10;
n is an integer having a value of at least 5 to 100;
and wherein $R^1$ is derived from at least 50 wt % $C_3$ and/or $C_4$ 1,2-alkylene radicals.
and wherein the residue according to formula (IIb) is an alkylenoxy unit defined as follows $$—[R1—O]_n—R^2 \quad (IIb)$$

in which the variables are defined as follows:

$R^1$ represents $C_2$-$C_{22}$-1,2-alkylene radicals;

$R^2$ represents hydrogen and/or $C_1$-$C_{10}$-alkyl and/or $C_7$-$C_{10}$-aralkyl, preferably H and/or $C_1$-$C_{10}$-alkyl, more preferably H and/or $C_1$-$C_3$-alkyl, even more preferably H and/or $C_1$-$C_4$-alkyl, most preferably H;

n is an integer having a value of at least 5 to 100;

and wherein $R^1$ is derived from at least 50 wt % $C_3$ and/or $C_4$ 1,2-alkylene radicals.

E3 is hydrogen in case E2 is a residue according to formula (IIa) or E3 is a residue according to formula (IIb);

E5 is hydrogen in case E4 is a residue according to formula (IIa) or E5 is a residue according to formula (IIb);

wherein 5 to 100%, preferably 20 to 100%, of the total amount of E2 and E4 is a residue according to formula (IIa) and 50 to 100% of the total amount of E1 is a residue according to formula (IIb).

Within the compounds according to general formula (I), it is preferred that R represents identical or different, linear or branched C2-C12-alkylene radicals, preferably R is ethylene, propylene or hexamethylene, or—alternatively—R is a cyclic alkylene-structure of C5 to C6, more preferably C6-alkylene, bearing 0 or 1, preferably 1 methyl-group at the cyclic alkyl-structure, and with at least one, preferably both, of the amine-groups of formula (i) being directly attached to the cyclic structure and one, preferably none of the amine-groups of formula (I), linked via a further methylene-group to the cyclic structure R.

It is even more preferred for the alkoxylated polyamine that within formulas (IIa) and/or (IIb) the variables are each defined as follows:

$R^1$ represents 1,2-ethylene, 1,2-propylene or 1,2-butylene, wherein $R^1$ is derived from at least 50 wt. % 1,2-propylene and/or 1,2-butylene, radicals, most preferably $R^1$ represents 1,2-propylene, $R^2$ represents hydrogen and/or $C_1$-$C_4$-alkyl, preferably hydrogen, methyl and/or ethyl, most preferably hydrogen; and/or $R^3$ represents linear or branched $C_2$-$C_{10}$-alkylene radicals, preferably linear or branched $C_2$-$C_5$-alkylene radicals; and/or m is an integer having a value in the range of 1 to 5, preferably of 1 to 3; and/or n is an integer having a value in the range of 8 to 40, preferably of 10 to 25, or—alternatively and more preferred—5 to 40 and preferably 5 to 35; and/or 20 to 100%, preferably 50 to 100%, even more preferably 80 to 100%, most preferably 90 to 100%, and utmost preferably more than 99% of the total amount of E2 and E4 is a residue according to formula (IIa) and 80 to 100%, most preferably 85 to 95% of the total amount of E1 is a residue according to formula (IIb).

In another embodiment, the alkoxylated polyamine of formula (I) is defined by the following variables:

R is a cyclic alkylene-structure of C5 to C8, preferably C5 to C6, more preferably C6-alkylene, optionally bearing 0 to 3, preferably 0 or 2, more preferably 0 or 1, most preferably 1, C1 to C3-alkyl, preferably methyl-group(s) at the cyclic alkyl-structure, and with at least one of the amine-groups of formula (i) being directly attached to the cyclic structure, and only one of the amine-groups of formula (I), linked via a further methylene-group to the cyclic structure R, and preferably with both of the amine-groups of formula (i) being directly attached to the cyclic structure, and none of the amine-groups of formula (I) linked via a further methylene-group to the cyclic structure R.;

y is zero,

E1, E2 and E4 represent an identical or different residue according to formula (IIa) or an identical or different residue according to formula (IIb), wherein the residue according to formula (IIa) is an alkylenoxy unit defined as follows (IIa)

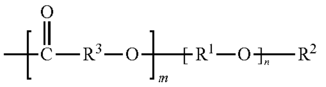

in which the variables are each defined as follows:

$R^1$ represents $C_2$-$C_{22}$-(1,2-alkylene) radicals;

$R^2$ represents hydrogen and/or $C_1$-$C_{10}$-alkyl and/or $C_7$-$C_{10}$-aralkyl, preferably H and/or $C_1$-$C_{10}$-alkyl, more preferably H and/or $C_1$-$C_3$-alkyl, even more preferably H and/or $C_1$-$C_4$-alkyl, most preferably H;

$R^3$ represents linear or branched $C_1$-$C_{22}$-alkylene radicals;

m is an integer having a value of at least 1 to 10;

n is an integer having a value of at least 5 to 100;

and wherein $R^1$ is derived from at least 50 wt % $C_3$ and/or $C_4$ (1,2-alkylene) radicals.

and wherein the residue according to formula (IIb) is an alkylenoxy unit defined as follows (IIb)

$$-\!\!\left[R1-O\right]_n\!\!-R^2$$

in which the variables are defined as follows:

$R^1$ represents $C_2$-$C_{22}$-(1,2-alkylene) radicals;

$R^2$ represents hydrogen and/or $C_1$-$C_{10}$-alkyl and/or $C_7$-$C_{10}$-aralkyl, preferably H and/or $C_1$-$C_{10}$-alkyl, more preferably H and/or $C_1$-$C_8$-alkyl, even more preferably H and/or $C_1$-$C_4$-alkyl, most preferably H n is an integer having a value of at least 5 to 100;

and wherein $R^1$ is derived from at least 50 wt % $C_3$- and/or $C_4$-1,2-alkylene radicals.

E3 is hydrogen in case E2 is a residue according to formula (IIa) or E3 is a residue according to formula (IIb);

E5 is hydrogen in case E4 is a residue according to formula (IIa) or E5 is a residue according to formula (IIb);

wherein 5 to 100%, preferably 20 to 100%, of the total amount of E2 and E4 is a residue according to formula (IIa) and 50 to 100% of the total amount of E1 is a residue according to formula (IIb).

It is also preferred for the alkoxylated polyamine according to general formula (I) that the molecular weight (Mw) of the polyamine backbone lies in the range of 50 to 10 000 g/mol, preferably in the range of 500 to 5000 g/mol, more preferably in the range of 600 to 2,000 g/mol, or—alternatively and more preferred—50 to 2,000 g/mol, preferably in the range of 80 to 1000 g/mol, more preferably in the range of 100 to 500 g/mol.

The inventive alkoxylated polyamines are preferably, but not limited to, alkoxylated hexamethylenediamine, alkoxylated ethylenediamine, alkoxylated 1,3-diaminopropane, alkoxylated neopentanediamine, alkoxylated diethylenetriamine, alkoxylated octamethylenediamine or alkoxylated 1,2-propylenediamine, or cyclic structures such as methylcyclohexane-diamines, such as 1-methyl cyclohexane-2,4-diamine, 2-methyl cyclohexane-1,3-diamine, and the mixtures of 1-methyl cyclohexane-2,4-diamine, 2-methyl cyclohexane-1,3-diamine, preferably in a ratio of 95:5 to 75:25, such as 85:15, 80:20, 90:10, most preferably about 85:15, or 3-(aminomethyl)-3,5,5-trimethylcyclohexane-1-amine, or mixtures thereof.

The R radicals connecting the amine nitrogen atoms may be identical or different, linear or branched $C_2$-$C_{12}$-alkylene radicals, preferably $C_2$-$C_6$-alkylene radicals, or cyclic alkylene radicals of $C_5$ to $C_8$, preferably $C_5$ or $C_6$, more preferably cyclohexane, optionally bearing further $C_1$ to $C_3$-alkyl-groups on the ring, and with the amine-groups being directly attached to the cyclic structure or linked via a further methylene-group; when R is a cyclic structure, y is zero. A preferred branched alkylene is 1,2-propylene. A particularly preferred alkylene radical R is ethylene or hexamethylene. However, it is also preferred that the radical R is an ether alkyl unit according to formula (III) as defined above.

In case the alkoxylated compounds according to general formula (I) are alkoxylated polyamines, it is preferred that the variables are defined as follows:

y is an integer having a value in the range of 0 to 10;

R represents identical or different, linear or branched $C_2$-$C_{12}$-alkylene radicals or an etheralkyl unit according to formula (III), wherein d is from 1 to 5, and $R^{10}$, $R^{11}$, $R^{12}$ are independently selected from linear or branched $C_3$ to $C_4$ alkylene radicals.

It is even more preferred for those kind of alkoxylated polyamine compounds according to formula (I) that $R^1$ represents 1,2-ethylene, 1,2-propylene and/or $C_4$-1,2-alkylene, wherein $R^1$ is derived from at least 50 wt % 1,2-propylene and/or $C_4$-1,2alkylene radicals;

$R^2$ represents hydrogen and/or $C_1$-$C_4$-alkyl, preferably hydrogen, methyl and/or ethyl, most preferably hydrogen;

$R^3$ represents linear or branched $C_2$-$C_{10}$-alkylene radicals, preferably linear or branched $C_2$-$C_5$-alkylene radicals;

m is an integer having a value in the range of 1 to 5, preferably of 1 to 3;

n is an integer having a value in the range of 8 to 40, preferably of 10 to 25;

y is an integer having a value in the range of 1 to 10;

wherein 50 to 100%, preferably 80 to 100%, even more preferably 90 to 100%, most preferably more than 99%, of the total amount of E2 and E4 is a residue according to formula (IIa) and 80 to 100%, most preferably 90 to 100% of the total amount of E1 is a residue according to formula (IIb).

In a preferred embodiment for alkoxylated polyamine compounds according to formula (I), the variables are defined as follows:

R is ethylene and/or propylene, preferably propylene;

$R^1$ represents 1,2-ethylene, 1,2-propylene and/or $C_4$-1,2-alkylene, wherein $R^1$ is derived from at least 50 wt % 1,2-propylene and/or $C_4$-1,2alkylene radicals;

$R^2$ represents hydrogen;

$R^3$ represents linear or branched $C_2$-$C_5$-alkylene radicals;

m is an integer having a value in the range of 1 to 3;

n is an integer having a value in the range of 10 to 25;

y is an integer having a value in the range of 2 to 4;

wherein 90 to 100%, most preferably more than 99%, of the total amount of E2 and E4 is a residue according to formula (IIa) and 90 to 100% of the total amount of E1 is a residue according to formula (IIb).

The inventive alkoxylated polyamines may also be quaternized. A suitable degree of quaternization is up to 100%, in particular from 10 to 95%. The quaternization is effected preferably by introducing $C_1$-$C_{22}$-alkyl groups, $C_1$-$C_4$-alkyl groups and/or $C_7$-$C_{22}$-aralkyl groups and may be undertaken in a customary manner by reaction with corresponding alkyl halides and dialkyl sulfates.

The quaternization may be advantageous in order to adjust the alkoxylated polyamines to the particular composition such as cosmetic compositions or home care composition such as compositions for cleaning of surfaces, laundry and the like, in which they are to be used, and to achieve better compatibility and/or phase stability of the formulation.

The quaternization of alkoxylated polyamines is achieved preferably by introducing $C_1$-$C_{22}$ alkyl, $C_1$-$C_4$-alkyl groups and/or $C_7$-$C_{22}$ aralkyl, aryl or alkylaryl groups and may be undertaken in a customary manner by reaction with corresponding alkyl-, aralkyl-halides and dialkylsulfates, as described for example in WO 09/060059.

Quaternization can be accomplished, for example, by reacting an alkoxylated polyamine with an alkylation agent such as a $C_1$-$C_4$-alkyl halide, for example with methyl bromide, methyl chloride, ethyl chloride, methyl iodide, n-butyl bromide, isopropyl bromide, or with an aralkyl halide, for example with benzyl chloride, benzyl bromide or with a di-$C_1$-$C_{22}$-alkyl sulfate in the presence of a base, especially with dimethyl sulfate or with diethyl sulfate. Suitable bases are, for example, sodium hydroxide and potassium hydroxide.

The amount of alkylating agent determines the amount of quaternization of the amino groups in the polymer, i.e. the amount of quaternized moieties.

The amount of the quaternized moieties can be calculated from the difference of the amine number in the non-quaternized amine and the quaternized amine.

The amine number can be determined according to the method described in DIN 16945.

The quaternization can be carried out without any solvent. However, a solvent or diluent like water, acetonitrile, dimethylsulfoxide, N-methylpyrrolidone, etc. may be used. The reaction temperature is usually in the range from 10° C. to 150° C. and is preferably from 50° C. to 100° C.

Also included herein is a process for preparing the alkoxylated polyamines as described above. Within this process, a polyamine backbone is first reacted with at least one lactone and/or at least one hydroxy carbon acid and then with at least one $C_2$-$C_{22}$-epoxide to obtain the respective alkoxylated compounds.

It has to be noted that the alkoxylation process as such, wherein a backbone of polyamines is reacted with alkylene oxides, such as ethylene oxide or propylene oxide, is known to a person skilled in the art. The same methods can be applied herein, wherein the respective backbones are first reacted with lactones or hydroxyl carbon acids, and the alkylation process is carried out afterwards. The reaction of the first step between the respective backbone and the lactones etc. is known to the skilled person.

It is preferred within said process that per mol of N—H functionalities in the polyamine, the respective polyamine backbone is reacted with at least 0.05 moles, preferably at least 0.2 moles, of at least one lactone and/or at least one hydroxy carbon acid and then with at least 5 moles of least one $C_2$-$C_{22}$-epoxide.

It is noted within the context of the method herein that those primary amino moieties of the respective backbone, which are reacted within the first reaction step with at least one lactone and/or at least one hydroxy carbon acid are transferred into an amido moiety wherein one of the originally two hydrogen atoms of the respective primary amino moiety is replaced by a fragment originating from the respective lactone or hydroxyl carbon acid, whereas the second hydrogen atom of the primary amino moiety of the backbone does not get substituted by this reaction. Beyond that, such a second hydrogen atom of the primary amino moiety of the backbone does also not become substituted within the second reaction step when the respective intermediate backbone is alkoxylated with at least one $C_2$-$C_{22}$-epoxide. In addition, each fragment of the intermediate backbone obtained in the first reaction step, which originates from the at least one lactone and/or at least one hydroxyl carbon acid, is reacted with at least one $C_2$-$C_{22}$-epoxide within the second reaction step. The conversion rate of the respective step can be determined according to methods known to the skilled person, such as NMR-spectroscopy. For example, both the first reaction step and the second reaction step may be monitored by $^{13}$C-NMR-spectroscopy and/or $^{1}$H-NMR-spectroscopy, as shown below within the experimental section in more detail.

In connection with the first step of the method for preparing an alkoxylated polyamine according to general formula (I) as defined above, the respective polyamine backbone is first reacted with at least one lactone and/or at least one hydroxycarbon acid. This first reaction step as such is known to a person skilled in the art.

However, it is preferred within this first reaction step that the reaction temperature is in a range between 50 to 200° C., more preferred between 70 to 180° C., most preferred in a range between 100 to 160° C.

This first reaction step may be carried out in the presence of at least one solvent and/or at least one catalyst. However, it is preferred within the first reaction step that the respective step is carried out without any solvent and/or without any catalyst. Suitable solvents are preferably selected from xylene, toluene, tetrahydrofuran (THF), methyl-tert. butyl ether or diethyl ether. Preferred catalysts are selected from alkali metal hydroxides or alkali metal alkoxides, such as KOMe or NaOMe or metal catalysts such as tin (II) octoate.

The alkoxylation as such (second reaction step of the method) may be carried out as a one-step reaction or the alkoxylation as such may be split into two or more individual steps.

It is preferred herein that the second step (alkoxylation) is carried out as a single step reaction.

Within this preferred embodiment, the alkoxylation is carried out in the presence of at least one catalyst and/or in the absence of water. Within this single step reaction of the alkoxylation step, the catalyst is preferably a basic catalyst. Examples of suitable catalysts are alkali metal and alkaline earth metal hydroxides such as sodium hydroxide, potassium hydroxide and calcium hydroxide, alkali metal alkoxides, in particular sodium and potassium $C_1$-$C_4$-alkoxides, such as sodium methoxide, sodium ethoxide and potassium tert-butoxide, alkali metal and alkaline earth metal hydrides such as sodium hydride and calcium hydride, and alkali metal carbonates such as sodium carbonate and potassium carbonate. Preference is given to the alkali metal hydroxides and the alkali metal alkoxides, particular preference being given to potassium hydroxide and sodium hydroxide. Typical use amounts for the base are from 0.05 to 10% by weight, in particular from 0.5 to 2% by weight, based on the total amount of polyamine and alkylene oxide.

One alternative procedure in connection with the second reaction step (alkoxylation) is a two-step reaction by initially undertaking only an incipient alkoxylation of the modified backbone of the polyamine obtained during the first step. In this first part of the second step, the modified backbone of the polyamine is reacted only with a portion of the total amount of ethylene oxide used, which corresponds to about 1 mole of ethylene oxide per mole of NH moiety or NH functionality, respectively. This reaction (of the first part of the second step) is undertaken generally in the absence of a catalyst in aqueous solution at from 70 to 200° C., preferably from 80 to 160° C., under a pressure of up to 10 bar, in particular up to 8 bar.

Said second part of the alkoxylation reaction (second step of the alternative method) is undertaken typically in the presence of the same type of catalyst as described above for the single step alkoxylation reaction.

The second step of alkoxylation may be undertaken in substance (variant a)) or in an organic solvent (variant b)). The process conditions specified below may be used for both steps of the alkoxylation reaction.

In variant a), the aqueous solution of the incipiently polyamine obtained in the first step, after addition of the catalyst, is initially dewatered. This can be done in a simple manner by heating to from 80 to 150° C. and distilling off the water under a reduced pressure of from less than 30 mbar. The subsequent reactions with the alkylene oxides are effected typically at from 70 to 200° C., preferably from 100 to 180° C., and at a pressure of up to 10 bar, in particular up to 8 bar, and a continued stirring time of from about 0.5 to 4 h at from about 100 to 160° C. and constant pressure follows in each case.

Suitable reaction media for variant b) are in particular nonpolar and polar aprotic organic solvents. Examples of particularly suitable nonpolar aprotic solvents include aliphatic and aromatic hydrocarbons such as hexane, cyclohexane, toluene and xylene. Examples of particularly suitable polar aprotic solvents are ethers, in particular cyclic ethers such as tetrahydrofuran and dioxane, N,N-dialkylamides such as dimethylformamide and dimethylacetamide, and N-alkyllactams such as N-methylpyrrolidone. It is of course also possible to use mixtures of these aprotic solvents. Preferred solvents are xylene and toluene.

In variant b) too, the solution obtained in the first step, after addition of catalyst and solvent, is initially dewatered, which is advantageously done by separating out the water at a temperature of from 120 to 180° C., preferably supported by a gentle nitrogen stream. The subsequent reaction with the alkylene oxide may be effected as in variant a).

In variant a), the polyamine is obtained directly in substance and may be converted if desired to an aqueous solution. In variant b), the organic solvent is typically removed and replaced by water. The products may of course also be isolated in substance.

The amount of residues according to formula (IIa) or formula (IIb) in connection with the definition for the substituents E1 to E5 can be controlled by several factors, such as the stoichiometry of the educts employed, the reaction temperature within the individual steps, the amount and/or type of the catalysts employed and/or the selected solvent.

In another preferred embodiment, the lactone is caprolactone, the hydroxy carbon acid is lactic acid and/or the $C_2$-$C_{22}$-epoxide is ethylene oxide.

In another preferred embodiment, the alkoxylated polyamine is additionally quaternized as described above. However, it is also possible to sulfatize the alkoxylated compounds instead of or in addition to the quaternization.

Another subject matter of the present application is the use of the above-mentioned alkoxylated polyamines in cleaning compositions and/or in fabric and home care products, preferably such product being a composition in the form of a liquid, a gel, a powder, a hydrocolloid, an aqueous solution, a granule, a tablet, a capsule, a single compartment sachet, a pad, a multi-compartment sachet, a single compartment pouch, or a multi-compartment pouch. Even more preferably such product is a composition that further comprises an ingredient selected from: surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer-inhibiting agent, a chelating agent, a hueing dye, a calcium cation, a magnesium cation, a visual signaling ingredient, an anti-foam, a structurant, a thickener, an anti-caking agent, a starch, sand, a gelling agent, or any combination thereof.

The inventive alkoxylated polyamines can be added to washing or cleaning compositions.

Another subject-matter of the present application is, therefore, a cleaning composition, fabric and home care product, comprising at least one alkoxylated polyamine, as defined above.

Preferably, it is a cleaning composition and/or fabric and home care product, comprising at least one alkoxylated polyamine, as defined above.

The inventive alkoxylated polyamines are present in said formulations at a concentration of 0.1 to 5 weight %, preferably at a concentration of 0.5 to 2 weight %.

The inventive alkoxylated polyamines can also be added to a cleaning composition comprising from about 1% to about 70% by weight of a surfactant system. The inventive alkoxylated polyamines may be present in a cleaning composition at a concentration of from about 0.1% to about 5% by weight of the composition, or at a concentration of from about 0.5% to about 2% by weight of the composition.

Fabric and Home Care Products

Laundry detergents, cleaning compositions and/or fabric and home care products as such are known to a person skilled in the art. Any composition etc. known to a person skilled in the art, in connection with the respective use, can be employed herein.

The laundry detergent, laundry detergent composition, the cleaning composition and/or the fabric and home care product are preferred, wherein the at least one alkoxylated polyamine is present in an amount ranging from about 0.01% to about 20%, preferably from about 0.05% to 15%, more preferably from about 0.1% to about 10%, and most preferably from about 0.5% to about 5%, in relation to the total weight of such composition or product.

Laundry detergent composition: Suitable laundry detergent compositions include laundry detergent powder compositions, laundry detergent liquid compositions, laundry detergent gel compositions, and water-soluble laundry detergent compositions.

Dish-washing detergent composition: Suitable dish-washing detergent compositions include hand dish-washing detergent compositions and automatic dish-washing detergent compositions.

Surfactant System: The compositions comprise a surfactant system in an amount sufficient to provide desired cleaning properties. In some embodiments, the composition comprises, by weight of the composition, from about 1% to about 70% of a surfactant system. In other embodiments, the liquid composition comprises, by weight of the composition, from about 2% to about 60% of the surfactant system. In further embodiments, the composition comprises, by weight of the composition, from about 5% to about 30% of the surfactant system. The surfactant system may comprise a detersive surfactant selected from anionic surfactants, nonionic surfactants, cationic surfactants, zwitterionic surfactants, amphoteric surfactants, ampholytic surfactants, and mixtures thereof. Those of ordinary skill in the art will understand that a detersive surfactant encompasses any surfactant or mixture of surfactants that provide cleaning, stain removing, or laundering benefit to soiled material.

Anionic Surfactants: In some examples, the surfactant system of the composition may comprise from about 1% to about 70%, by weight of the surfactant system, of one or more anionic surfactants. In other examples, the surfactant system of the composition may comprise from about 2% to about 60%, by weight of the surfactant system, of one or more anionic surfactants. In further examples, the surfactant system of the composition may comprise from about 5% to about 30%, by weight of the surfactant system, of one or more anionic surfactants. In further examples, the surfactant system may consist essentially of, or even consist of one or more anionic surfactants.

Specific, non-limiting examples of suitable anionic surfactants include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates.

Other useful anionic surfactants can include the alkali metal salts of alkyl benzene sulfonates, in which the alkyl group contains from about 9 to about 15 carbon atoms, in straight chain (linear) or branched chain configuration.

Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

The detersive surfactant may be a mid-chain branched detersive surfactant, in one aspect, a mid-chain branched anionic detersive surfactant, in one aspect, a mid-chain branched alkyl sulphate and/or a mid-chain branched alkyl benzene sulphonate, for example, a mid-chain branched alkyl sulphate. In one aspect, the mid-chain branches are $C_{1-4}$ alkyl groups, typically methyl and/or ethyl groups.

Other anionic surfactants useful herein are the water-soluble salts of: paraffin sulfonates and secondary alkane sulfonates containing from about 8 to about 24 (and in some examples about 12 to 18) carbon atoms; alkyl glyceryl ether sulfonates, especially those ethers of $C_{8-18}$ alcohols (e.g., those derived from tallow and coconut oil). Mixtures of the alkylbenzene sulfonates with the above-described paraffin sulfonates, secondary alkane sulfonates and alkyl glyceryl ether sulfonates are also useful. Further suitable anionic surfactants include methyl ester sulfonates and alkyl ether carboxylates.

The anionic surfactants may exist in an acid form, and the acid form may be neutralized to form a surfactant salt. Typical agents for neutralization include metal counterion bases, such as hydroxides, e.g., NaOH or KOH. Further suitable agents for neutralizing anionic surfactants in their acid forms include ammonia, amines, or alkanolamines. Non-limiting examples of alkanolamines include monoethanolamine, diethanolamine, triethanolamine, and other linear or branched alkanolamines known in the art; suitable alkanolamines include 2-amino-1-propanol, 1-aminopropanol, monoisopropanolamine, or 1-amino-3-propanol. Amine neutralization may be done to a full or partial extent, e.g., part of the anionic surfactant mix may be neutralized with sodium or potassium and part of the anionic surfactant mix may be neutralized with amines or alkanolamines.

Nonionic Surfactants:

The surfactant system of the composition may comprise a nonionic surfactant. In some examples, the surfactant system comprises up to about 25%, by weight of the surfactant system, of one or more nonionic surfactants, e.g., as a co-surfactant. In some examples, the compositions comprises from about 0.1% to about 15%, by weight of the surfactant system, of one or more nonionic surfactants. In further examples, the compositions comprises from about 0.3% to about 10%, by weight of the surfactant system, of one or more nonionic surfactants.

Suitable nonionic surfactants useful herein can comprise any conventional nonionic surfactant. These can include, for e.g., alkoxylated fatty alcohols and amine oxide surfactants.

Other non-limiting examples of nonionic surfactants useful herein include: $C_8$-$C_{18}$ alkyl ethoxylates, such as, NEODOL® nonionic surfactants from Shell; $C_6$-$C_{12}$ alkyl phenol alkoxylates wherein the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols (BA); $C_{14}$-$C_{22}$ mid-chain branched alkyl alkoxylates ($BAE_x$), wherein x is from 1 to 30; alkylpolysaccharides; specifically alkylpolyglycosides; Polyhydroxy fatty acid amides; and ether capped poly(oxyalkylated) alcohol surfactants.

Suitable nonionic detersive surfactants also include alkyl polyglucoside and alkyl alkoxylated alcohol. Suitable nonionic surfactants also include those sold under the tradename Lutensol® from BASF.

Anionic/Nonionic Combinations:

The surfactant system may comprise combinations of anionic and nonionic surfactant materials. In some examples, the weight ratio of anionic surfactant to nonionic surfactant is at least about 2:1. In other examples, the weight ratio of anionic surfactant to nonionic surfactant is at least about 5:1. In further examples, the weight ratio of anionic surfactant to nonionic surfactant is at least about 10:1.

Cationic Surfactants:

The surfactant system may comprise a cationic surfactant. In some aspects, the surfactant system comprises from about 0% to about 7%, or from about 0.1% to about 5%, or from about 1% to about 4%, by weight of the surfactant system, of a cationic surfactant, e.g., as a co-surfactant. In some aspects, the compositions are substantially free of cationic surfactants and surfactants that become cationic below a pH of 7 or below a pH of 6. Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, specifically amido propyldimethyl amine (APA).

Suitable cationic detersive surfactants also include alkyl pyridinium compounds, alkyl quaternary ammonium compounds, alkyl quaternary phosphonium compounds, alkyl ternary sulphonium compounds, and mixtures thereof.

Zwitterionic Surfactants:

Examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. Betaines, including alkyl dimethyl betaine and cocodimethyl amidopropyl betaine, $C_8$ to $C_{18}$ (for example from $C_{12}$ to $C_{18}$) amine oxides and sulfo and hydroxy betaines, such as N-alkyl-N,N-dimethylamino-1-propane sulfonate where the alkyl group can be $C_8$ to $C_{18}$ and in certain embodiments from $C_{10}$ to $C_{14}$.

Amphoteric Surfactants:

Examples of amphoteric surfactants include aliphatic derivatives of secondary or tertiary amines, or aliphatic derivatives of heterocyclic secondary and tertiary amines in which the aliphatic radical may be straight- or branched-chain and where one of the aliphatic substituents contains at least about 8 carbon atoms, typically from about 8 to about 18 carbon atoms, and at least one of the aliphatic substituents contains an anionic water-solubilizing group, e.g. carboxy, sulfonate, sulfate. Examples of compounds falling within this definition are sodium 3-(dodecylamino)propionate, sodium 3-(dodecylamino) propane-1-sulfonate, sodium 2-(dodecylamino)ethyl sulfate, sodium 2-(dimethylamino) octadecanoate, disodium 3-(N-carboxymethyldodecylamino)propane 1-sulfonate, disodium octadecyl-iminodiacetate, sodium 1-carboxymethyl-2-undecylimidazole, and sodium N,N-bis (2-hydroxyethyl)-2-sulfato-3-dodecoxypropylamine. Suitable amphoteric surfactants also include sarcosinates, glycinates, taurinates, and mixtures thereof.

Branched Surfactants:

Suitable branched detersive surfactants include anionic branched surfactants selected from branched sulphate or branched sulphonate surfactants, e.g., branched alkyl sulphate, branched alkyl alkoxylated sulphate, and branched alkyl benzene sulphonates, comprising one or more random alkyl branches, e.g., $C_{1-4}$ alkyl groups, typically methyl and/or ethyl groups.

The branched detersive surfactant may be a mid-chain branched detersive surfactant, typically, a mid-chain branched anionic detersive surfactant, for example, a mid-chain branched alkyl sulphate and/or a mid-chain branched alkyl benzene sulphonate. In some aspects, the detersive surfactant is a mid-chain branched alkyl sulphate. In some aspects, the mid-chain branches are $C_{1-4}$alkyl groups, typically methyl and/or ethyl groups.

Further suitable branched anionic detersive surfactants include surfactants derived from alcohols branched in the 2-alkyl position, such as those sold under the trade names Isalchem®123, Isalchem®125, Isalchem®145, Isalchem®167, which are derived from the oxo process. Due to the oxo process, the branching is situated in the 2-alkyl position. These 2-alkyl branched alcohols are typically in the range of C11 to C14/C15 in length and comprise structural isomers that are all branched in the 2-alkyl position.

Adjunct Cleaning Additives:

The compositions may also contain adjunct cleaning additives. Suitable adjunct cleaning additives include builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, brighteners, dyes, hueing agents, dye transfer inhibiting agents, chelating agents, suds suppressors, softeners, and perfumes.

Enzymes:

The compositions described herein may comprise one or more enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in a composition, the aforementioned additional enzymes may be present at levels from about 0.00001% to about 2%, from about 0.0001% to about 1% or even from about 0.001% to about 0.5% enzyme protein by weight of the composition.

In one aspect preferred enzymes would include a protease. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii*.

(b) trypsin-type or chymotrypsin-type proteases, such as trypsin (e.g., of porcine or bovine origin), including the *Fusarium* protease and the chymotrypsin proteases derived from Cellumonas.

(c) metalloproteases, including those derived from *Bacillus amyloliquefaciens*.

Preferred proteases include those derived from *Bacillus gibsonii* or *Bacillus Lentus*.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP with the following mutations S99D+S101 R+S103A+V1041+G159S, hereinafter referred to as BLAP), BLAP R (BLAP with S3T+V4I+V199M+V2051+L217D), BLAP X (BLAP with S3T+V4I+V2051) and BLAP F49 (BLAP with S3T+V4I+A194P+V199M+V2051+L217D)—all from Henkel/Kemira; and KAP (*Bacillus alkalophilus* subtilisin with mutations A230V+S256G+S259N) from Kao.

Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375, DSM 12368, DSMZ no. 12649, KSM AP1378, KSM K36 or KSM K38.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, California) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

In one aspect, such enzymes may be selected from the group consisting of: lipases, including "first cycle lipases". In one aspect, the lipase is a first-wash lipase, preferably a variant of the wild-type lipase from *Thermomyces lanuginosus* comprising one or more of the T231R and N233R mutations. The wild-type sequence is the 269 amino acids (amino acids 23-291) of the Swissprot accession number Swiss-Prot O59952 (derived from *Thermomyces lanuginosus* (*Humicola lanuginosa*)). Preferred lipases would include those sold under the tradenames Lipex® and Lipolex®.

In one aspect, other preferred enzymes include microbial-derived endoglucanases exhibiting endo-beta-1,4-glucanase activity (E.C. 3.2.1.4) and mixtures thereof. Suitable endoglucanases are sold under the tradenames Celluclean® and Whitezyme® (Novozymes A/S, Bagsvaerd, Denmark).

Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Purabrite® (Genencor International Inc., Palo Alto, California).

Enzyme Stabilizing System:

The enzyme-containing compositions described herein may optionally comprise from about 0.001% to about 10%, in some examples from about 0.005% to about 8%, and in other examples, from about 0.01% to about 6%, by weight of the composition, of an enzyme stabilizing system. The enzyme stabilizing system can be any stabilizing system which is compatible with the detersive enzyme. In the case of aqueous detergent compositions comprising protease, a reversible protease inhibitor, such as a boron compound, including borate, 4-formyl phenylboronic acid, phenylboronic acid and derivatives thereof, or compounds such as calcium formate, sodium formate and 1,2-propane diol may be added to further improve stability.

Builders:

The compositions may optionally comprise a builder. Built compositions typically comprise at least about 1% builder, based on the total weight of the composition. Liquid compositions may comprise up to about 10% builder, and in some examples up to about 8% builder, of the total weight of the composition. Granular compositions may comprise up to about 30% builder, and in some examples up to about 5% builder, by weight of the composition.

Builders selected from aluminosilicates (e.g., zeolite builders, such as zeolite A, zeolite P, and zeolite MAP) and silicates assist in controlling mineral hardness in wash water, especially calcium and/or magnesium, or to assist in the removal of particulate soils from surfaces. Suitable builders may be selected from the group consisting of phosphates, such as polyphosphates (e.g., sodium tri-polyphosphate), especially sodium salts thereof; carbonates, bicarbonates, sesquicarbonates, and carbonate minerals other than sodium carbonate or sesquicarbonate; organic mono-, di-, tri-, and tetracarboxylates, especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. These may be complemented by borates, e.g., for pH-buffering purposes, or by sulfates, especially sodium sulfate and any other fillers or carriers which may be important to the engineering of stable surfactant and/or builder-containing compositions. Additional suitable builders may be selected from citric acid, lactic acid, fatty acid, polycarboxylate builders, for example, copolymers of acrylic acid, copolymers of acrylic acid and maleic acid, and copolymers of acrylic acid and/or maleic acid, and other suitable ethylenic monomers with various types of additional functionalities. Also suitable for use as builders herein are synthesized crystalline ion exchange materials or hydrates thereof having chain structure and a composition represented by the following general anhydride form: $x(M_2O) \cdot ySiO_2 \cdot zM'O$ wherein M is Na and/or K, M' is Ca and/or Mg; y/x is 0.5 to 2.0; and z/x is 0.005 to 1.0.

Alternatively, the composition may be substantially free of builder.

Structurant/Thickeners:

Suitable structurant/thickeners include:

i. Di-benzylidene Polyol Acetal Derivative
ii. Bacterial Cellulose
iii. Coated Bacterial Cellulose
iv. Cellulose fibers non-bacterial cellulose derived
v. Non-Polymeric Crystalline Hydroxyl-Functional Materials
vi. Polymeric Structuring Agents
vii. Di-amido-gellants
viii. Any combination of above.

Polymeric Dispersing Agents:

The composition may comprise one or more polymeric dispersing agents. Examples are carboxymethylcellulose, poly(vinylpyrrolidone), poly (ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid copolymers.

The composition may comprise one or more amphiphilic cleaning polymers such as the compound having the following general structure: $bis((C_2H_5O)(C_2H_4O)n)(CH_3)—N^+—C_xH_{2x}—N^+—(CH_3)-bis((C_2H_5O)(C_2H_4O)n)$, wherein n=from 20 to 30, and x=from 3 to 8, or sulphated or sulphonated variants thereof.

The composition may comprise amphiphilic alkoxylated grease cleaning polymers which have balanced hydrophilic and hydrophobic properties such that they remove grease particles from fabrics and surfaces. Specific embodiments of the amphiphilic alkoxylated grease cleaning polymers comprise a core structure and a plurality of alkoxylate groups attached to that core structure. These may comprise alkoxylated polyalkyleneimines, for example, having an inner polyethylene oxide block and an outer polypropylene oxide block.

Alkoxylated polyamines may be used for grease and particulate removal. Such compounds may include, but are not limited to, ethoxylated polyethyleneimine, ethoxylated hexamethylene diamine, and sulfated versions thereof. Polypropoxylated derivatives may also be included. A wide variety of amines and polyalkyleneimines can be alkoxylated to various degrees. A useful example is 600 g/mol polyethyleneimine core ethoxylated to 20 EO groups per NH and is available from BASF.

The composition may comprise random graft polymers comprising a hydrophilic backbone comprising monomers, for example, unsaturated $C_1$-$C_6$ carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof. A specific example of such graft polymers based on polyalkylene oxides and vinyl esters, in particular vinyl acetate. These polymers are typically prepared by polymerizing the vinyl ester in the presence of the polyalkylene oxide, the initiator used being dibenzoyl peroxide, dilauroyl peroxide or diacetyl peroxide.

The composition may comprise blocks of ethylene oxide, propylene oxide. Examples of such block polymers include ethylene oxide-propylene oxide-ethylene oxide (EO/PO/EO) triblock copolymer, wherein the copolymer comprises a first EO block, a second EO block and PO block wherein the first EO block and the second EO block are linked to the PO block. Blocks of ethylene oxide, propylene oxide, butylene oxide can also be arranged in other ways, such as (EO/PO) deblock copolymer, (PO/EO/PO) triblock copolymer. The block polymers may also contain additional butylene oxide (BO) block.

Carboxylate polymer—The composition may also include one or more carboxylate polymers such as a maleate/acrylate random copolymer or polyacrylate homopolymer. In one aspect, the carboxylate polymer is a polyacrylate homopolymer having a molecular weight of from 4,000 Da to 9,000 Da, or from 6,000 Da to 9,000 Da.

Soil Release Polymer: The compositions described herein may include from about 0.01% to about 10.0%, typically from about 0.1% to about 5%, in some aspects from about 0.2% to about 3.0%, by weight of the composition, of a soil release polymer (also known as a polymeric soil release agents or "SRA").

Soil release polymers typically have hydrophilic segments to hydrophilize the surface of hydrophobic fibers (such as polyester and nylon), and hydrophobic segments to deposit on hydrophobic fibers and remain adhered thereto through completion of washing and rinsing cycles, thereby serving as an anchor for the hydrophilic segments. This may enable stains occurring subsequent to treatment with a soil release agent to be more easily cleaned in later washing procedures. It is also believed that facilitating the release of soils helps to improve or maintain the wicking properties of a fabric.

The structure and charge distribution of the soil release polymer may be tailored for application to different fibers or textile types and for formulation in different detergent or detergent additive products. Soil release polymers may be linear, branched, or star-shaped.

Soil release polymers may also include a variety of charged units (e.g., anionic or cationic units) and/or non-charged (e.g., nonionic) monomer units. Typically, a nonionic SRP may be particularly preferred when the SRP is used in combination with a cationic fabric conditioning active, such as a quaternary ammonium ester compound, in order to avoid potentially negative interactions between the SRP and the cationic active.

Soil release polymer may include an end capping moiety, which is especially effective in controlling the molecular weight of the polymer or altering the physical or surface-active properties of the polymer.

One preferred class of suitable soil release polymers include terephthalate-derived polyester polymers, which comprise structure unit (I) and/or (II):

(I) $-[(OCHR^1-CHR^2)_a-O-OC-Ar-CO-]_d$ (II) $-[(OCHR^3-CHR^4)_b-O-OC\text{-}sAr\text{-}CO-]_e$ wherein:

a, b are from 1 to 200;

d, e are from 1 to 50;

Ar is a 1,4-substituted phenylene;

sAr is 1,3-substituted phenylene substituted in position 5 with $SO_3M$;

M is a counterion selected from Na, Li, K, Mg/2, Ca/2, Al/3, ammonium, mono-, di-, tri-, or tetraalkylammonium wherein the alkyl groups are $C_1$-$C_{18}$ alkyl or $C_2$-Cao hydroxyalkyl, or mixtures thereof;

$R^1$, $R^2$, $R^3$, $R^4$ are independently selected from H or $C_1$-$C_{18}$ n-alkyl or iso-alkyl;

Optionally, the polymer further comprises one or more terminal group (III) derived from polyalkylene glycolmonoalkylethers, preferably selected from structure (IV-a)

$$-O-[C_2H_4-O]_c-[C_3H_6-O]_d-[C_4H_8-O]_e-R_7 \quad \text{(IV-a)}$$

wherein:

$R_7$ is a linear or branched $C_{1\text{-}30}$ alkyl, $C_2$-$C_{30}$ alkenyl, or a cycloalkyl group with 5 to 9 carbon atoms, or a $C_3$-$C_{30}$ aryl group, or a $C_6$-$C_{30}$ arylalkyl group; preferably $C_{1\text{-}4}$ alkyl, more preferably methyl; and c, d and e are, based on molar average, a number independently selected from 0 to 200, where the sum of c+d+e is from 2 to 500, wherein the $[C_2H_4-O]$, $[C_3H_6-O]$ and $[C_4H_8-O]$ groups of the terminal group (IV-a) may be arranged blockwise, alternating, periodically and/or statistically, preferably blockwise and/or statistically, either of the $[C_2H_4-O]$, $[C_3H_6-O]$ and $[C_4H_8-O]$ groups of the terminal group (IV-a) can be linked to $-R_7$ and/or $-O$.

Optionally, the polymer further comprises one or more anionic terminal unit (IV) and/or (V) as described in EP3222647. Where M is a counterion selected from Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof.

$$-O-CH_2CH_2-SO_3M \quad \text{(IV)}$$

(V)

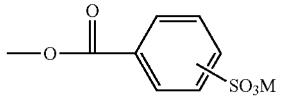

Optionally, the polymer may comprise crosslinking multifunctional structural unit which having at least three functional groups capable of the esterification reaction. The functional which may be for example acid-, alcohol-, ester-, anhydride- or epoxy groups, etc.

Optionally, the polymer may comprise other di- or polycarboxylic acids or their salts or their (di)alkylesters can be used in the polyesters herein, such as, naphthalene-1,4-dicarboxylic acid, naphthalene-2,6,-dicarboxylic acid, tetrahydrophthalic acid, trimellitic acid, diphenoxyethane-4,4'-dicarboxylic acid, diphenyl-4,4'-dicarboxylic acid, 2,5-furandicarboxylic acid, adipic acid, sebacic acid, decan-1, 10-dicarboxylic acid, fumaric acid, succinic acid, 1,4-cyclohexanedicarboxylic acid, cyclohexanediacetic acid, glutaric acid, azelaic acid, or their salts or their (di)alkyl esters, preferably their ($C_1$-$C_4$)-(di)alkyl esters and more preferably their (di)methyl esters, or mixtures thereof.

Preferably, suitable terephthalate-derived soil release polymers are nonionic, which does not comprise above structure (II). A further particular preferred nonionic terephthalate-derived soil release polymer has a structure according to formula below:

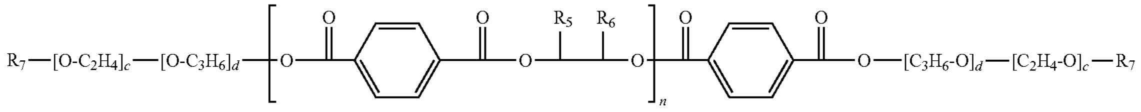

wherein:

$R_5$ and $R_6$ is independently selected from H or $CH_3$. More preferably, one of the $R_5$ and $R_6$ is H, and another is $CH_3$.

c, d are, based on molar average, a number independently selected from 0 to 200, where the sum of c+d is from 2 to 400, More preferably, d is from 0 to 50, c is from 1 to 200, More preferably, d is 1 to 10, c is 5 to 150, $R_7$ is $C_{1\text{-}4}$ alkyl and more preferably methyl, n is, based on molar average, from 1 to 50.

One example of most preferred above suitable terephthalate-derived soil release polymers has one of the $R_5$ and $R_6$ is H, and another is $CH_3$; d is 0; c is from 5-100 and $R_7$ is methyl.

Suitable terephthalate-derived soil release polymers may be also described as sulphonated and unsulphonated PET/POET (polyethylene terephthalate/polyoxyethylene terephthalate) polymers, both end-capped and non-end-capped. Example of suitable soil release polymers include TexCare® polymers, including TexCare® SRA-100, SRA-300, SRN-100, SRN-170, SRN-240, SRN-260, SRN-300, and SRN-325, supplied by Clariant.

Other suitable terephthalate-derived soil release polymers are described in patent WO2014019903, WO2014019658 and WO2014019659.

Another class of soil release polymer also include modified cellulose. Suitable modified cellulose may include nonionic modified cellulose derivatives such as cellulose alkyl ether and cellulose hydroxyalkyl ethers. Example of such cellulose alkyl ether and cellulose hydroxyalkyl ethers include methyl cellulose, ethyl cellulose, hydroxyethyl cellulose, hydroxypropyl cellulose, hydroxypropyl methylcellulose, hydroxybutyl methyl cellulose. In some embodiment, the modified cellulose may comprise hydrocarbon of $C_4$ or above, preferred length of the alkyl group may be $C_4$, $C_6$, $C_8$, $C_{10}$, $C_{12}$, $C_{14}$, $C_{16}$, $C_{18}$; example of suitable modified cellulose are described in WO2019111948 and WO2019111949. In some embodiment, the modified cellulose may comprise additional cationic modification, example of suitable modified cellulose with additional cationic modification are described in WO2019111946 and WO2019111947.

Other examples of commercial soil release polymers are the REPEL-O-TEX® line of polymers supplied by Rhodia, including REPEL-O-TEX® SF, SF-2, and SRP6. Other suitable soil release polymers are Marloquest® polymers, such as Marloquest® SL, HSCB, L235M, B, and G82, supplied by Sasol. Further suitable soil release polymers of a different type include the commercially available material ZELCON 5126 (from DuPont) and MILEASE T (from ICI), Sorez 100 (from ISP).

Cellulosic Polymer:

The compositions described herein may include from about 0.1% to about 10%, typically from about 0.5% to about 7%, in some aspects from about 3% to about 5%, by weight of the composition, of a cellulosic polymer.

Suitable cellulosic polymers include alkyl cellulose, alkylalkoxyalkyl cellulose, carboxyalkyl cellulose, and alkyl carboxyalkyl cellulose. In some aspects, the cellulosic polymer is selected from carboxymethyl cellulose, methyl cellulose, methyl hydroxyethyl cellulose, methyl carboxymethyl cellulose, or mixtures thereof. In certain aspects, the cellulosic polymer is a carboxymethyl cellulose having a degree of carboxymethyl substitution of from about 0.5 to about 0.9 and a molecular weight from about 100,000 Da to about 300,000 Da.

Carboxymethylcellulose polymers include Finnfix® GDA (sold by CP Kelko), a hydrophobically modified carboxymethylcellulose, e.g., the alkyl ketene dimer derivative of carboxymethylcellulose sold under the tradename Finnfix® SH1 (CP Kelko), or the blocky carboxymethylcellulose sold under the tradename Finnfix®V (sold by CP Kelko).

Additional Amines:

Additional amines may be used in the compositions described herein for added removal of grease and particulates from soiled materials. The compositions described herein may comprise from about 0.1% to about 10%, in some examples, from about 0.1% to about 4%, and in other examples, from about 0.1% to about 2%, by weight of the composition, of additional amines. Non-limiting examples of additional amines may include, but are not limited to, polyamines, oligoamines, triamines, diamines, pentamines, tetramines, or combinations thereof. Specific examples of suitable additional amines include tetraethylenepentamine, triethylenetetraamine, diethylenetriamine, or a mixture thereof.

For example, alkoxylated polyamines may be used for grease and particulate removal. Such compounds may include, but are not limited to, ethoxylated polyethyleneimine, ethoxylated hexamethylene diamine, and sulfated versions thereof. Polypropoxylated derivatives may also be included. A wide variety of amines and polyalkyleneimines can be alkoxylated to various degrees. A useful example is 600 g/mol polyethyleneimine core ethoxylated to 20 EO groups per NH and is available from BASF. The compositions described herein may comprise from about 0.1% to about 10%, and in some examples, from about 0.1% to about 8%, and in other examples, from about 0.1% to about 6%, by weight of the composition, of alkoxylated polyamines.

Alkoxylated polycarboxylates may also be used in the compositions herein to provide grease removal. Chemically, these materials comprise polyacrylates having one ethoxy side-chain per every 7-8 acrylate units. The side-chains are of the formula $-(CH_2CH_2O)_m(CH_2)_nCH_3$ wherein m is 2-3 and n is 6-12. The side-chains are ester-linked to the polyacrylate "backbone" to provide a "comb" polymer type structure. The molecular weight can vary, but may be in the range of about 2000 to about 50,000. The compositions described herein may comprise from about 0.1% to about 10%, and in some examples, from about 0.25% to about 5%, and in other examples, from about 0.3% to about 2%, by weight of the composition, of alkoxylated polycarboxylates.

Bleaching Compounds, Bleaching Agents, Bleach Activators, and Bleach Catalysts:

The compositions described herein may contain bleaching agents or bleaching compositions containing a bleaching agent and one or more bleach activators. Bleaching agents may be present at levels of from about 1% to about 30%, and in some examples from about 5% to about 20%, based on the total weight of the composition. If present, the amount of bleach activator may be from about 0.1% to about 60%, and in some examples from about 0.5% to about 40%, of the bleaching composition comprising the bleaching agent plus bleach activator.

Examples of bleaching agents include oxygen bleach, perborate bleach, percarboxylic acid bleach and salts thereof, peroxygen bleach, persulfate bleach, percarbonate bleach, and mixtures thereof.

In some examples, compositions may also include a transition metal bleach catalyst.

Bleaching agents other than oxygen bleaching agents are also known in the art and can be utilized in compositions. They include, for example, photoactivated bleaching agents, or pre-formed organic peracids, such as peroxycarboxylic acid or salt thereof, or a peroxysulphonic acid or salt thereof. A suitable organic peracid is phthaloylimidoperoxycaproic acid. If used, the compositions described herein will typically contain from about 0.025% to about 1.25%, by weight of the composition, of such bleaches, and in some examples, of sulfonate zinc phthalocyanine.

Brighteners:

Optical brighteners or other brightening or whitening agents may be incorporated at levels of from about 0.01% to about 1.2%, by weight of the composition, into the compositions described herein. Commercial brighteners, which may be used herein, can be classified into subgroups, which include, but are not necessarily limited to, derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents.

In some examples, the fluorescent brightener is selected from the group consisting of disodium 4,4'-bis{[4-anilino-6-morpholino-s-triazin-2-yl]-amino}-2,2'-stilbenedisulfonate (brightener 15, commercially available under the tradename Tinopal AMS-GX by Ciba Geigy Corporation), disodium4,4'-bis{[4-anilino-6-(N-2-bis-hydroxyethyl)-s-triazine-2-yl]-amino}-2,2'-stilbenedisulfonate (commercially available under the tradename Tinopal UNPA-GX by Ciba-Geigy Corporation), disodium 4,4'-bis{[4-anilino-6-(N-2-hydroxyethyl-N-methylamino)-s-triazine-2-yl]-amino}-2,2'-stilbenedisulfonate (commercially available under the tradename Tinopal 5BM-GX by Ciba-Geigy Corporation). More preferably, the fluorescent brightener is disodium 4,4'-bis{[4-anilino-6-morpholino-s-triazin-2-yl]-amino}-2,2'-stilbenedisulfonate.

The brighteners may be added in particulate form or as a premix with a suitable solvent, for example nonionic surfactant, monoethanolamine, propane diol.

Fabric Hueing Agents:

The compositions may comprise a fabric hueing agent (sometimes referred to as shading, bluing or whitening agents). Typically, the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Dye Transfer Inhibiting Agents:

The compositions may also include one or more materials effective for inhibiting the transfer of dyes from one fabric to another during the cleaning process. Generally, such dye transfer inhibiting agents may include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents may be used at a concentration of about 0.0001% to about 10%, by weight of the composition, in some examples, from about 0.01% to about 5%, by weight of the composition, and in other examples, from about 0.05% to about 2% by weight of the composition.

Chelating Agents:

The compositions described herein may also contain one or more metal ion chelating agents. Suitable molecules include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins, and mixtures therein. Chelating agents can be present in the acid or salt form including alkali metal, ammonium, and substituted ammonium salts thereof, and mixtures thereof.

The chelant may be present in the compositions disclosed herein at from about 0.005% to about 15% by weight, about 0.01% to about 5% by weight, about 0.1% to about 3.0% by weight, or from about 0.2% to about 0.7% by weight, or from about 0.3% to about 0.6% by weight of the composition.

Aminocarboxylates useful as chelating agents include, but are not limited to ethylenediaminetetracetates (EDTA); N-(hydroxyethyl)ethylenediaminetriacetates (HEDTA); nitrilotriacetates (NTA); ethylenediamine tetraproprionates; triethylenetetraaminehexacetates, diethylenetriamine-pentaacetates (DTPA); methylglycinediacetic acid (MGDA); Glutamic acid diacetic acid (GLDA); ethanoldiglycines; triethylenetetraaminehexaacetic acid (TTHA); N-hydroxyethyliminodiacetic acid (HEIDA); dihydroxyethylglycine (DHEG); ethylenediaminetetrapropionic acid (EDTP) and derivatives thereof.

Encapsulates:

The compositions may comprise an encapsulate. In some aspects, the encapsulate comprises a core, a shell having an inner and outer surface, where the shell encapsulates the core.

In certain aspects, the encapsulate comprises a core and a shell, where the core comprises a material selected from perfumes; brighteners; dyes; insect repellants; silicones; waxes; flavors; vitamins; fabric softening agents; skin care agents, e.g., paraffins; enzymes; anti-bacterial agents; bleaches; sensates; or mixtures thereof; and where the shell comprises a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts, or mixtures thereof. In some aspects, where the shell comprises an aminoplast, the aminoplast comprises polyurea, polyurethane, and/or polyureaurethane. The polyurea may comprise polyoxymethyleneurea and/or melamine formaldehyde.

Fabric and home care products are typically suitable for: (a) the care of finished textiles, cleaning of finished textiles, sanitization of finished textiles, disinfection of finished textiles, detergents, stain removers, softeners, fabric enhancers, stain removal or finished textiles treatments, pre and post wash treatments, washing machine cleaning and maintenance, with finished textiles intended to include garments and items made of cloth; (b) the care of dishes, glasses, crockery, cooking pots, pans, utensils, cutlery and the like in automatic, in-machine washing, including detergents, preparatory post treatment and machine cleaning and maintenance products for both the dishwasher, the utilized water and its contents; or (c) manual hand dish washing detergents.

The fabric and home care product typically comprises additional fabric and home care ingredients, such as those described in more detail above.

Liquid Laundry Detergent Composition.

The fabric and home care product can be a laundry detergent composition, such as a liquid laundry detergent composition. Suitable liquid laundry detergent compositions can comprise a non-soap surfactant, wherein the non-soap surfactant comprises an anionic non-soap surfactant and a non-ionic surfactant. The laundry detergent composition can comprise from 10% to 60%, or from 20% to 55% by weight of the laundry detergent composition of the non-soap surfactant. The non-soap anionic surfactant to non-ionic surfactant are from 1:1 to 20:1, from 1.5:1 to 17.5:1, from 2:1 to 15:1, or from 2.5:1 to 13:1. Suitable non-soap anionic surfactants include linear alkylbenzene sulphonate, alkyl sulphate or a mixture thereof. The weight ratio of linear alkylbenzene sulphonate to alkyl sulphate can be from 1:2 to 9:1, from 1:1 to 7:1, from 1:1 to 5:1, or from 1:1 to 4:1. Suitable linear alkylbenzene sulphonates are $C_{10}$-$C_{16}$ alkyl benzene sulfonic acids, or $C_{11}$-$C_{14}$alkyl benzene sulfonic acids. Suitable alkyl sulphate anionic surfactants include alkoxylated alkyl sulphates, non-alkoxylated alkyl sulphates, and mixture thereof. Preferably, the HLAS surfactant comprises greater than 50% $C_{12}$, preferably greater than 60%, preferably greater than 70% $C_{12}$, more preferably greater than 75% $C_{12}$. Suitable alkoxylated alkyl sulphate anionic surfactants include ethoxylated alkyl sulphate anionic surfactants. Suitable alkyl sulphate anionic surfactants include ethoxylated alkyl sulphate anionic surfactant with a mol average degree of ethoxylation of from 1 to 5, from 1 to 3, or from 2 to 3. The alkyl alkoxylated sulfate may have a broad alkoxy distribution or a peaked alkoxy distribution. The alkyl portion of the AES may include, on average, from 13.7 to about 16 or from 13.9 to 14.6 carbons atoms. At least about 50% or at least about 60% of the AES molecule may include having an alkyl portion having 14 or more carbon atoms, preferable from 14 to 18, or from 14 to 17, or from 14 to 16, or from 14 to 15 carbon atoms. The alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, from 1 to 3, or from 2 to 3. The alkyl fraction of the alkyl sulphate anionic surfactant can be derived from fatty alcohols, oxo-synthesized alcohols, Guerbet alcohols, or mixtures thereof. Preferred alkyl sulfates include optionally ethoxylated alcohol sulfates including 2-alkyl branched primary alcohol sulfates especially 2-branched $C_{12-15}$ primary alcohol sulfates, linear primary alcohol sulfates especially linear $C_{12-14}$ primary alcohol sulfates, and mixtures thereof. The laundry detergent composition can comprise from 10% to 50%, or from 15% to 45%, or from 20% to 40%, or from 30% to 40% by weight of the laundry detergent composition of the non-soap anionic surfactant.

Suitable non-ionic surfactants can be selected from alcohol broad or narrow range alkoxylates, an oxo-synthesised alcohol alkoxylate, Guerbet alcohol alkoxylates, alkyl phenol alcohol alkoxylates, or a mixture thereof. The laundry detergent composition can comprise from 0.01% to 10%, from 0.01% to 8%, from 0.1% to 6%, or from 0.15% to 5% by weight of the liquid laundry detergent composition of a non-ionic surfactant.

The laundry detergent composition comprises from 1.5% to 20%, or from 2% to 15%, or from 3% to 10%, or from 4% to 8% by weight of the laundry detergent composition of soap, such as a fatty acid salt. Such soaps can be amine neutralized, for instance using an alkanolamine such as monoethanolamine.

The laundry detergent composition can comprises an adjunct ingredient selected from the group comprising builders including citrate, enzymes, bleach, bleach catalyst, dye, hueing dye, Leuco dyes, brightener, cleaning polymers including alkoxylated polyamines and polyethyleneimines, amphiphilic copolymers, soil release polymer, surfactant, solvent, dye transfer inhibitors, chelant, diamines, perfume, encapsulated perfume, polycarboxylates, structurant, pH trimming agents, antioxidants, antibacterial, antimicrobial agents, preservatives and mixtures thereof.

The laundry detergent composition can have a pH of from 2 to 11, or from 6.5 to 8.9, or from 7 to 8, wherein the pH of the laundry detergent composition is measured at a 10% product concentration in demineralized water at 20° C.

The liquid laundry detergent composition can be Newtonian or non-Newtonian, preferably non-Newtonian.

For liquid laundry detergent compositions, the composition can comprise from 5% to 99%, or from 15% to 90%, or from 25% to 80% by weight of the liquid detergent composition of water.

The detergent composition can be liquid laundry detergent composition. The following are exemplary liquid laundry detergent formulations. Preferably the liquid laundry detergent composition comprises from between 0.1% and 4.0%, preferably between 0.5% and 3%, more preferably between 1% to 2.5% by weight of the detergent composition of the sulfatized esteramine as described herein.

TABLE 1

| Raw Material | Comp. 1 % wt | Comp. 2 % wt | Comp. 3 % wt | Comp. 4 % wt |
|---|---|---|---|---|
| Branched Alkyl Sulfate | 0.0 | 5.3 | 0.0 | 5.3 |
| Sodium Lauryl Sulfate | 0.0 | 3.0 | 0.0 | 3.0 |
| Linear alkylbenzene sulfonate | 18.0 | 5.0 | 6.0 | 5.0 |
| AE3S Ethoxylated alkyl sulphate with an average degree of ethoxylation of 3 | 5.0 | 0.0 | 1.3 | 0.0 |
| C25AES Ethoxylated alkyl sulphate with an average degree of ethoxylation of 2.5[1] | 0.0 | 3.0 | 1.4 | 0.0 |
| Amine oxide | 0.7 | 1.0 | 0.4 | 0.8 |
| C24 alkyl ethoxylate (EO7) | 8.4 | 0.0 | 12.9 | 5.0 |
| C24 alkyl ethoxylate (EO9) | 0.0 | 8.7 | 0.0 | 3.7 |
| C45 alkyl ethoxylate (EO7) | 0.0 | 2.7 | 0.0 | 2.7 |
| Citric acid | 2.9 | 2.3 | 0.7 | 2.3 |
| Palm kernel fatty acid | 0.0 | 1.0 | 0.0 | 1.0 |
| Topped kernel fatty acid | 2.9 | 0.0 | 2.3 | 0.0 |
| Mannanase | 0.0017 | 0.0017 | 0.0017 | 0.0017 |
| Pectawash | 0.00342 | 0.00342 | 0.00342 | 0.00342 |
| Amylase | 0.00766 | 0.00766 | 0.00766 | 0.00766 |
| Protease | 0.07706 | 0.07706 | 0.07706 | 0.07706 |
| Nuclease[3] | 0.010 | 0.01 | 0.01 | 0.01 |
| Sodium tetraborate | 0.0 | 1.7 | 0.0 | 1.7 |
| MEA-Boric Acid Salt | 0.0 | 0.0 | 0.8 | 0.0 |
| Calcium/sodium formate | 0.0 | 0.04 | 0.01 | 0.04 |
| Sodium/Calcium Chloride | 0.04 | 0.02 | 0.03 | 0.02 |
| Ethoxylated polyethyleneimine[2] | 0.0 | 2.0 | 1.1 | 2.0 |
| Amphiphilic graft copolymer | 1.5 | 0.0 | 0.0 | 0.0 |
| Ethoxylated-Propoxylated polyethyleneimine | 0.0 | 2.0 | 0.8 | 2.0 |
| Zwitterionic polyamine | 0.5 | 0.0 | 0.0 | 0.0 |
| Nonionic polyester terephthalate | 1.0 | 1.0 | 1.0 | 1.0 |
| Alkoxylated polyamine of the present invention | 1.0 | 2.0 | 1.5 | 2.5 |
| DTPA | 0.0 | 0.1 | 0.2 | 0.1 |
| EDDS | 0.1 | 0.0 | 0.0 | 0.0 |
| GLDA | 0.4 | 0.3 | 0.1 | 0.0 |
| MGDA | 0.2 | 0.0 | 0.0 | 0.5 |
| Diethylene triamine penta(methylphosphonic) acid (DTPMP) | 1.1 | 0.0 | 0.0 | 0.0 |
| Fluorescent Brightener[8] | 0.06 | 0.22 | 0.03 | 0.15 |
| Ethanol | 0.7 | 1.9 | 0.0 | 1.9 |
| propylene glycol | 5.5 | 5.5 | 0.33 | 5.5 |
| Sorbitol | 0.01 | 0.01 | 0.0 | 0.01 |
| Monoethanolamine | 0.2 | 0.2 | 0.6 | 0.2 |
| DETA | 0.1 | 0.08 | 0.0 | 0.08 |
| Antioxidant 1 | 0.0 | 0.1 | 0.1 | 0.1 |
| Antioxidant 2 | 0.1 | 0.0 | 0.0 | 0.0 |
| Hygiene Agent | 0.0 | 0.0 | 0.05 | 0.0 |
| NaOH | 4.7 | 4.7 | 1.1 | 4.7 |
| NaCS | 3.2 | 1.7 | 3.2 | 1.7 |
| Hydrogenated Castor Oil | 0.2 | 0.1 | 0.12 | 0.1 |
| Aesthetic dye | 0.10 | 0.01 | 0.006 | 0.01 |
| Leuco dye | 0.05 | 0.01 | 0.0 | 0.01 |
| Perfume | 2.0 | 1.3 | 0.5 | 1.3 |
| Perfume microcapsules | 0.5 | 0.05 | 0.1 | 0.05 |
| Silicone antifoam[7] | 0.02 | 0.01 | 0.0 | 0.01 |
| Phenyloxyethanol | 0.002 | 0.01 | 0.0 | 0.01 |
| Hueing dye | 0.01 | 0.1 | 0.05 | 0.1 |
| Water & miscellaneous | balance | balance | balance | balance |

Explanation of super-scripts:

[1]C12-15EO2.5S AlkylethoxySulfate where the alkyl portion of AES includes from about 13.9 to 14.6 carbon atoms

[2]PE-20 commercially available from BASF

[3]Nuclease enzyme is as claimed in co-pending European application 19219568.3

4 Antioxidant 1 is 3,5-bis(1,1-dimethylethyl)-4-hydroxybenzenepropanoic acid, methyl ester [6386-38-5]

5 Antioxidant 2 is Tinogard TS commercially available from BASF

6 Hygiene Agent is agent is Tinosan HP 100 commercially available from BASF

[7]Dow Corning supplied antifoam blend 80-92% ethylmethyl, methyl(2-phenyl propyl) siloxane; 5-14% MQ Resin in octyl stearate a 3-7% modified silica.

[8]Fluorescent Brightener is disodium 4,4'-bis{[4-anilino-6-morpholino-s-triazin-2-yl]-amino}-2,2'-stilbenedisulfonate or 2,2'-([1,1'-Biphenyl]-4,4'-diyldi-2,1-ethenediyl)bis-benzenesulfonic acid disodium salt.

Water Soluble Unit Dose Article.

The fabric and home care product can be a water-soluble unit dose article. The water-soluble unit dose article comprises at least one water-soluble film orientated to create at least one unit dose internal compartment, wherein the at least one unit dose internal compartment comprises a detergent composition. The water-soluble film preferably comprises polyvinyl alcohol homopolymer or polyvinyl alcohol copolymer, for example a blend of polyvinylalcohol homopolymers and/or polyvinylalcohol copolymers, for example copolymers selected from sulphonated and carboxylated anionic polyvinylalcohol copolymers, especially carboxylated anionic polyvinylalcohol copolymers, for example a blend of a polyvinylalcohol homopolymer and a carboxylated anionic polyvinylalcohol copolymer. In some examples water soluble films are those supplied by Monosol under the trade references M8630, M8900, M8779, M8310. The detergent product comprises a detergent composition, more preferably a laundry detergent composition. Preferably the laundry detergent composition enclosed in the water-soluble unit dose article comprises from between 0.1% and 8%, preferably between 0.5% and 7%, more preferably 1.0% to 6.0% by weight of the detergent composition of the sulfatized esteramine. Preferably the soluble unit dose laundry detergent composition comprises a non-soap surfactant, wherein the non-soap surfactant comprises an anionic non-soap surfactant and a non-ionic surfactant. More preferably, the laundry detergent composition comprises between 10% and 60%, or between 20% and 55% by weight of the laundry detergent composition of the non-soap surfactant. The weight ratio of non-soap anionic surfactant to nonionic surfactant preferably is from 1:1 to 20:1, from 1.5:1 to 17.5:1, from 2:1 to 15:1, or from 2.5:1 to 13:1. The non-soap anionic surfactants preferably comprise linear alkylbenzene sulphonate, alkyl sulphate or a mixture thereof. The weight ratio of linear alkylbenzene sulphonate to alkyl sulphate preferably is from 1:2 to 9:1, from 1:1 to 7:1, from 1:1 to 5:1, or from 1:1 to 4:1. Example linear alkylbenzene sulphonates are $C_{10}$-$C_{16}$ alkyl benzene sulfonic acids, or $C_{11}$-$C_{14}$alkyl benzene sulfonic acids. By 'linear', we herein mean the alkyl group is linear. Example alkyl sulphate anionic surfactant may comprise alkoxylated alkyl sulphate or non-alkoxylated alkyl sulphate or a mixture thereof. Example alkoxylated alkyl sulphate anionic surfactants comprise an ethoxylated alkyl sulphate anionic surfactant. Example alkyl sulphate anionic surfactant may comprise an ethoxylated alkyl sulphate anionic surfactant with a mol average degree of ethoxylation from 1 to 5, from 1 to 3, or from 2 to 3. Example alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, from 1 to 3, or from 2 to 3. Example alkyl fraction of the alkyl sulphate anionic surfactant are derived from fatty alcohols, oxo-synthesized alcohols, Guerbet alcohols, or mixtures thereof. Preferably the laundry detergent composition comprises between 10% and 50%, between 15% and 45%, between 20% and 40%, or between 30% and 40% by weight of the laundry detergent composition of the non-soap anionic surfactant. In some examples, the non-ionic surfactant is selected from alcohol alkoxylate, an oxo-synthesised alcohol alkoxylate, Guerbet alcohol alkoxylates, alkyl phenol alcohol alkoxylates, or a mixture thereof. Preferably, the laundry detergent composition comprises between 0.01% and 10%, or between 0.01% and 8%, or between 0.1% and 6%, or between 0.15% and 5% by weight of the liquid laundry detergent composition of a non-ionic surfactant. Preferably, the laundry detergent composition comprises between 1.5% and 20%, between 2% and 15%, between 3% and 10%, or between 4% and 8% by weight of the laundry detergent composition of soap, in some examples a fatty acid salt, in some examples an amine neutralized fatty acid salt, wherein in some examples the amine is an alkanolamine preferably monoethanolamine. Preferably the liquid laundry detergent composition comprises less than 15%, or less than 12% by weight of the liquid laundry detergent composition of water. Preferably, the laundry detergent composition comprises between 10% and 40%, or between 15% and 30% by weight of the liquid laundry detergent composition of a non-aqueous solvent selected from 1,2-propanediol, dipropylene glycol, tripropyleneglycol, glycerol, sorbitol, polyethylene glycol or a mixture thereof. Preferably the liquid laundry detergent composition comprises from 0.1% to 10%, preferably from 0.5% to 8% by weight of the detergent composition of further soil release polymers, preferably selected from the group of nonionic and/or anionically modified polyester terephthalate soil release polymers such as commercially available under the Texcare brand name from Clariant, amphiphilic graft polymers such as those based on polyalkylene oxides and vinyl esters, polyalkoxylated polyethyleneimines, and mixtures thereof. Preferably the liquid detergent composition further comprises from 0.1% to 10% preferably from 1% to 5% of a chelant. In some examples, the laundry detergent composition comprises an adjunct ingredient selected from the group comprising builders including citrate, enzymes, bleach, bleach catalyst, dye, hueing dye, brightener, cleaning polymers including (zwitterionic) alkoxylated polyamines, surfactant, solvent, dye transfer inhibitors, perfume, encapsulated perfume, polycarboxylates, structurant, pH trimming agents, and mixtures thereof. Preferably, the laundry detergent composition has a pH between 6 and 10, between 6.5 and 8.9, or between 7 and 8, wherein the pH of the laundry detergent composition is measured as a 10% product concentration in demineralized water at 20° C. When liquid, the laundry detergent composition may be Newtonian or non-Newtonian, preferably non-Newtonian.

The following is an exemplary water-soluble unit dose formulation. The composition can be part of a single chamber water soluble unit dose article or can be split over multiple compartments resulting in below "averaged across compartments" full article composition. The composition is enclosed within a polyvinyl alcohol-based water soluble, the polyvinyl alcohol comprising a blend of a polyvinyl alcohol homopolymer and an anionic e.g. carboxylated polyvinyl alcohol copolymer.

TABLE 2

| Ingredients | Composition 4 (wt %) |
|---|---|
| Fatty alcohol ethoxylate non-ionic surfactant, $C_{12-14}$ average degree of ethoxylation of 7 | 3.8 |
| Lutensol XL100 | 0.5 |
| Linear $C_{11-14}$ alkylbenzene sulphonate | 24.6 |
| AE3S Ethoxylated alkyl sulphate with an average degree of ethoxylation of 3 | 12.5 |
| Citric acid | 0.7 |
| Palm Kernel Fatty acid | 5.3 |
| Nuclease enzyme* (wt % active protein) | 0.01 |
| Protease enzyme (wt % active protein) | 0.07 |
| Amylase enzyme (wt % active protein) | 0.005 |
| Xyloglucanese enzyme (wt % active protein) | 0.005 |
| Mannanase enzyme (wt % active protein) | 0.003 |
| Ethoxylated polyethyleneimine | 1.4 |

TABLE 2-continued

| Ingredients | Composition 4 (wt %) |
|---|---|
| (Lutensol FP620 - PEI600EO20) | |
| Amphiphilic graft copolymer** | 1.6 |
| Zwitterionic polyamine (Lutensit Z96) | 1.5 |
| Anionic polyester terephthalate (Texcare SRA300) | 0.6 |
| Alkoxylated polyamine of the present invention | 3.0 |
| HEDP | 2.2 |
| Brightener 49 | 0.4 |
| Silicone anti-foam | 0.3 |
| Hueing dye | 0.05 |
| 1,2 PropaneDiol | 11.0 |
| Glycerine | 4.7 |
| DPG (DiPropyleneGlycol) | 1.7 |
| TPG (TriPropyleneGlycol) | 0.1 |
| Sorbitol | 0.1 |
| Monoethanolamine | 10.2 |
| $K_2SO_3$ | 0.4 |
| $MgCl_2$ | 0.3 |
| water | 10.5 |
| Hydrogenated castor oil | 0.1 |
| Perfume | 2.1 |
| Aesthetic dye & Minors | Balance to 100 |
| pH (10% product concentration in demineralized water at 20° C.) | 7.4 |

*Nuclease enzyme is as claimed in co-pending European application 19219568.3

**polyethylene glycol graft polymer comprising a polyethylene glycol backbone (Pluriol E6000) and hydrophobic vinyl acetate side chains, comprising 40% by weight of the polymer system of a polyethylene glycol backbone polymer and 60% by weight of the polymer system of the grafted vinyl acetate side chains Hand Dishwashing Liquid Composition.

The fabric and home care product can be a dishwashing detergent composition, such as a hand dishwashing detergent composition, more preferably a liquid hand dishwashing detergent composition. Preferably the liquid hand dishwashing detergent composition comprises from between 0.1% and 5.0%, preferably between 0.5% and 4%, more preferably 1.0% to 3.0% by weight of the detergent composition of the sulfatized esteramine. The liquid hand-dishwashing detergent composition preferably is an aqueous composition, comprising from 50% to 90%, preferably from 60% to 75%, by weight of the total composition of water. Preferably the pH of the detergent composition, measured as a 10% product concentration in demineralized water at 20° C., is adjusted to between 3 and 14, more preferably between 4 and 13, more preferably between 6 and 12 and most preferably between 8 and 10. The composition can be Newtonian or non-Newtonian, preferably Newtonian. Preferably, the composition has a viscosity of from 10 mPa·s to 10,000 mPa·s, preferably from 100 mPa·s to 5,000 mPa·s, more preferably from 300 mPa·s to 2,000 mPa·s, or most preferably from 500 mPa·s to 1,500 mPa·s, alternatively combinations thereof. The viscosity is measured at 20° C. with a Brookfield RT Viscometer using spindle 31 with the RPM of the viscometer adjusted to achieve a torque of between 40% and 60%.

The composition comprises from 5% to 50%, preferably from 8% to 45%, more preferably from 15% to 40%, by weight of the total composition of a surfactant system. The surfactant system preferably comprises from 60% to 90%, more preferably from 70% to 80% by weight of the surfactant system of an anionic surfactant. Alkyl sulphated anionic surfactants are preferred, particularly those selected from the group consisting of: alkyl sulphate, alkyl alkoxy sulphate preferably alkyl ethoxy sulphate, and mixtures thereof. The alkyl sulphated anionic surfactant preferably has an average alkyl chain length of from 8 to 18, preferably from 10 to 14, more preferably from 12 to 14, most preferably from 12 to 13 carbon atoms. The alkyl sulphated anionic surfactant preferably has an average degree of alkoxylation preferably ethoxylation, of less than 5, preferably less than 3, more preferably from 0.5 to 2.0, most preferably from 0.5 to 0.9. The alkyl sulphate anionic surfactant preferably has a weight average degree of branching of more than 10%, preferably more than 20%, more preferably more than 30%, even more preferably between 30% and 60%, most preferably between 30% and 50%. Suitable counterions include alkali metal cation earth alkali metal cation, alkanolammonium or ammonium or substituted ammonium, but preferably sodium. Suitable examples of commercially available alkyl sulphate anionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company.

The surfactant system preferably comprises from 0.1% to 20%, more preferably from 0.5% to 15% and especially from 2% to 10% by weight of the liquid hand dishwashing detergent composition of a co-surfactant. Preferred co-surfactants are selected from the group consisting of an amphoteric surfactant, a zwitterionic surfactant, and mixtures thereof. The anionic surfactant to the co-surfactant weight ratio can be from 1:1 to 8:1, preferably from 2:1 to 5:1, more preferably from 2.5:1 to 4:1. The co-surfactant is preferably an amphoteric surfactant, more preferably an amine oxide surfactant. Preferably, the amine oxide surfactant is selected from the group consisting of: alkyl dimethyl amine oxide, alkyl amido propyl dimethyl amine oxide, and mixtures thereof, most preferably C12-C14 alkyl dimethyl amine oxide. Suitable zwitterionic surfactants include betaine surfactants, preferably cocamidopropyl betaine.

Preferably, the surfactant system of the composition further comprises from 1% to 25%, preferably from 1.25% to 20%, more preferably from 1.5% to 15%, most preferably from 1.5% to 5%, by weight of the surfactant system, of a non-ionic surfactant. Suitable nonionic surfactants can be selected from the group consisting of: alkoxylated non-ionic surfactant, alkyl polyglucoside ("APG") surfactant, and mixtures thereof. Suitable alkoxylated non-ionic surfactants can be linear or branched, primary or secondary alkyl alkoxylated preferably alkyl ethoxylated non-ionic surfactants comprising on average from 9 to 15, preferably from 10 to 14 carbon atoms in its alkyl chain and on average from 5 to 12, preferably from 6 to 10, most preferably from 7 to 8, units of ethylene oxide per mole of alcohol. Most preferably, the alkyl polyglucoside surfactant has an average alkyl carbon chain length between 10 and 16, preferably between 10 and 14, most preferably between 12 and 14, with an average degree of polymerization of between 0.5 and 2.5 preferably between 1 and 2, most preferably between 1.2 and 1.6. C8-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation).

The liquid hand dishwashing detergent composition herein may optionally comprise a number of other adjunct ingredients such as builders (e.g., preferably citrate), chelants (e.g., preferably GLDA), conditioning polymers, cleaning polymers including polyalkoxylated polyalkylene imines, surface modifying polymers, soil flocculating polymers, sudsing polymers including EO-PO-EO triblock copolymers, grease cleaning amines including cyclic polyamines, structurants, emollients, humectants, skin rejuvenating actives, enzymes, carboxylic acids, scrubbing particles, bleach and bleach activators, perfumes, malodor control agents, pigments, dyes, opacifiers, beads, pearlescent particles, microcapsules, organic solvents, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, phosphoric and sulfonic acids, carbonates such as sodium carbonates, bicarbonates, sesquicarbonates, borates, silicates, phosphates, imidazole and alike).

The following is an exemplary liquid hand dishwashing detergent formulation. The formulation can be made through standard mixing of the individual components.

TABLE 3

| As 100% active | Composition 5 (wt %) |
|---|---|
| C1213AE0.6S anionic surfactant (Avg. branching: 37.84%) | 19.6 |
| C1214 dimethyl amine oxide | 6.5 |
| Alcohol ethoxylate nonionic surfactant (Neodol 91/8) | 1.0 |
| Alkoxylated polyethyleneimine (PEI600EO24PO16) | 0.2 |
| Alkoxylated polyamine of the present invention | 1.0 |
| Ethanol | 2.4 |
| NaCl | 0.7 |
| Polypropyleneglycol (MW2000) | 0.9 |
| Water + Minor ingredients (perfume, dye, preservatives) | Balance to 100 |
| pH (at 10% product concentration in demineralized water- with NaOH trimming) | 9.0 |

Solid Free-Flowing Particulate Laundry Detergent Composition.

The fabric and home care product can be solid free-flowing particulate laundry detergent composition. The following is an exemplary solid free-flowing particulate laundry detergent composition.

TABLE 4

| Ingredient | Composition 6 (wt %) |
|---|---|
| Anionic detersive surfactant (such as alkyl benzene sulphonate, alkyl ethoxylated sulphate and mixtures thereof) | from 8 wt % to 15 wt % |
| Non-ionic detersive surfactant (such as alkyl ethoxylated alcohol) | from 0.1 wt % to 4 wt % |
| Cationic detersive surfactant (such as quaternary ammonium compounds) | from 0 wt % to 4 wt % |
| Other detersive surfactant (such as zwitterionic detersive surfactants, amphoteric surfactants and mixtures thereof) | from 0 wt % to 4 wt % |
| Carboxylate polymer (such as co-polymers of maleic acid and acrylic acid and/or carboxylate polymers comprising ether moieties and sulfonate moieties) | from 0.1 wt % to 4 wt % |
| Polyethylene glycol polymer (such as a polyethylene glycol polymer comprising polyvinyl acetate side chains) | from 0 wt % to 4 wt % |
| Polyester soil release polymer (such as Repel-o-tex and/or Texcare polymers) | from 0 wt % to 2 wt % |
| Cellulosic polymer (such as carboxymethyl cellulose, methyl cellulose and combinations thereof) | from 0.5 wt % to 2 wt % |
| Alkoxylated polyamine of the present invention | From 0.1 wt % to 4 wt % |
| Other polymer (such as care polymers) | from 0 wt % to 4 wt % |
| Zeolite builder and phosphate builder (such as zeolite 4A and/or sodium tripolyphosphate) | from 0 wt % to 4 wt % |
| Other co-builder (such as sodium citrate and/or | from 0 wt % |

TABLE 4-continued

| Ingredient | Composition 6 (wt %) |
|---|---|
| citric acid) | to 3 wt % |
| Carbonate salt (such as sodium carbonate and/or sodium bicarbonate) | from 0 wt % to 20 wt % |
| Silicate salt (such as sodium silicate) | from 0 wt % to 10 wt % |
| Filler (such as sodium sulphate and/or bio-fillers) | from 10 wt % to 70 wt % |
| Source of hydrogen peroxide (such as sodium percarbonate) | from 0 wt % to 20 wt % |
| Bleach activator (such as tetraacetylethylene diamine (TAED) and/or nonanoyloxybenzenesulphonate (NOBS)) | from 0 wt % to 8 wt % |
| Bleach catalyst (such as oxaziridinium-based bleach catalyst and/or transition metal bleach catalyst) | from 0 wt % to 0.1 wt % |
| Other bleach (such as reducing bleach and/or pre-formed peracid) | from 0 wt % to 10 wt % |
| Photobleach (such as zinc and/or aluminium sulphonated phthalocyanine) | from 0 wt % to 0.1 wt % |
| Chelant (such as ethylenediamine-N'N'-disuccinic acid (EDDS) and/or hydroxyethane diphosphonic acid (HEDP)) | from 0.2 wt % to 1 wt % |
| Hueing agent (such as direct violet 9, 66, 99, acid red 50, solvent violet 13 and any combination thereof) | from 0 wt % to 1 wt % |
| Brightener (C.I. fluorescent brightener 260 or C.I. fluorescent brightener 351) | from 0.1 wt % to 0.4 wt % |
| Protease (such as Savinase, Savinase Ultra, Purafect, FN3, FN4 and any combination thereof) | from 0.1 wt % to 0.4 wt % |
| Amylase (such as Termamyl, Termamyl ultra, Natalase, Optisize, Stainzyme, Stainzyme Plus and any combination thereof) | from 0 wt % to 0.2 wt % |
| Cellulase (such as Carezyme and/or Celluclean) | from 0 wt % to 0.2 wt % |
| Lipase (such as Lipex, Lipolex, Lipoclean and any combination thereof) | from 0 wt % to 1 wt % |
| Other enzyme (such as xyloglucanase, cutinase, pectate lyase, mannanase, bleaching enzyme) | from 0 wt % to 2 wt % |
| Fabric softener (such as montmorillonite clay and/or polydimethylsiloxane (PDMS)) | from 0 wt % to 15 wt % |
| Flocculant (such as polyethylene oxide) | from 0 wt % to 1 wt % |
| Suds suppressor (such as silicone and/or fatty acid) | from 0 wt % to 4 wt % |
| Perfume (such as perfume microcapsule, spray-on perfume, starch encapsulated perfume accords, perfume loaded zeolite, and any combination thereof) | from 0.1 wt % to 1 wt % |
| Aesthetics (such as coloured soap rings and/or coloured speckles/noodles) | from 0 wt % to 1 wt % |
| Miscellaneous | balance to 100 wt % |

Experimental Section

The following examples shall further illustrate the present invention without restricting the scope of the invention.

The amount of amines substituted with E1-E5=hydrogen can determined by identification of primary, secondary and tertiary amino groups in $^{13}$C-NMR, as described for polyethylene imines in Lukovkin G. M., Pshezhetsky V. S., Murtazaeva G. A.: *Europ. Polymer Journal* 1973, 9, 559-565 and St. Pierre T., Geckle M.: *ACS Polym. Prep.* 1981, 22, 128-129.

$^{13}$C-NMR spectra are recorded in $CDCl_3$ with a Bruker AV-401 instrument at room temperature. $^{1}$H-NMR spectra are recorded in $CDCl_3$ or $CD_3OD$ with a Bruker AV-401 instrument at room temperature.

Saponification values are measured according to DIN EN ISO 3657: 2013.

Polymer Measurements

K-value measures the relative viscosity of dilute polymer solutions and is a relative measure of the weight average molecular weight. As the weight average molecular weight of the polymer increases for a particular polymer, the K-value tends to also increase. The K-value is determined in a 3% by weight NaCl solution at 23° C. and a polymer concentration of 1% polymer according to the method of H. Fikentscher in "Cellulosechemie", 1932, 13, 58.

The number average molecular weight ($M_n$), the weight average molecular weight ($M_w$) and the polydispersity $M_w/M_n$ of the inventive graft polymers were determined by gel permeation chromatography in tetrahydrofuran. The mobile phase (eluent) used was tetrahydrofuran comprising 0.035 mol/L diethanolamine. The concentration of graft polymer in tetrahydrofuran was 2.0 mg per mL. After filtration (pore size 0.2 μm), 100 μL of this solution were injected into the GPC system. Four different columns (heated to 60° C.) were used for separation (SDV precolumn, SDV 1000A, SDV 100000A, SDV 1000000A). The GPC system was operated at a flow rate of 1 mL per min. A DRI Agilent 1100 was used as the detection system. Poly (ethylene glycol) (PEG) standards (PL) having a molecular weight $M_n$ from 106 to 1,378,000 g/mol were used for the calibration.

"MCDA", i.e. methylcyclohexyl diamine was employed as a mixture of isomers in a ratio of about 84:16 of 1-methyl cyclohexane-2,4-diamine: 2-methyl cyclohexane-1,3-diamine.

EXAMPLES

Synthesis Examples

The following examples have been performed with the shown results obtained (also see Table 5), following the described procedures:

Example 1

Hexamethylene Diamine, Reacted with 0.25 Mole Caprolactone/Mole, Propoxylated with 12 Mole Propylene Oxide/Mole

1a—Hexamethylene Diamine, Reacted with 0.25 Mole Caprolactone/Mole

In a 0.5 l four-neck vessel equipped with stirrer, reflux condenser, dropping funnel, thermometer, and nitrogen inlet 612.4 g hexamethylene diamine and 5.4 g potassium methylate (30% in methanol) are placed and heated to 120° C. At this temperature 150.4 g caprolactone is added within 0.5 hour. After complete addition of caprolactone, the reaction mixture is stirred at 120° C. for 3 hours at 120° C. $^1$H-NMR in MeOD indicates complete conversion of caprolactone. 750.0 g of a light yellow oil, which solidifies at room temperature, is obtained.

1b—Hexamethylene Diamine, Reacted with 0.25 Mole Caprolactone/Mole, Propoxylated with 12 Mole Propylene Oxide/Mole A 2 l autoclave is filled with 145.4 g hexamethylene diamine, reacted with 0.25 mole caprolactone/mole (example 1a) and heated to 110° C. The vessel is purged three times with nitrogen. The vessel is heated to 140° C. and 696.9 g propylene oxide is added within 10 h. To complete the reaction, the mixture is allowed to post-react for additional 7 h at 140° C. The reaction mixture is stripped with nitrogen and volatile compounds are removed in vacuo at 90° C. 840.0 g of a highly viscous light yellow oil is obtained (saponification value: 5.5 mgKOH/g).

Example 2

Hexamethylene Diamine, Reacted with 0.25 Mole Caprolactone/Mole, Propoxylated with 32 Mole Propylene Oxide/Mole A 2 l autoclave is filled with 252.5 g hexamethylene diamine, reacted with 0.25 mole caprolactone/mole and propoxylated with 12 mole propylene oxide/mole (example 1 b) and 0.97 g potassium tert. butoxide. The mixture is heated to 110° C., and the vessel is purged three times with nitrogen. The vessel is heated to 140° C. and 348.5 g propylene oxide is added within 5 h. To complete the reaction, the mixture is allowed to post-react for additional 10 h at 140° C. The reaction mixture is stripped with nitrogen and volatile compounds are removed in vacuo at 90° C. 600.0 g of a highly viscous light brown oil is obtained (saponification value: 4.8 mgKOH/g).

Example 3

Hexamethylene Diamine, Reacted with 0.25 Mole Caprolactone/Mole, Propoxylated with 60 Mole Propylene Oxide/Mole A 2 l autoclave is filled with 168.3 g hexamethylene diamine, reacted with 0.25 mole caprolactone/mole and propoxylated with 12 mole propylene oxide/mole (example 1 b) and 1.3 g potassium tert. butoxide. The mixture is heated to 110° C., and the vessel is purged three times with nitrogen. The vessel is heated to 140° C. and 557.6 g propylene oxide is added within 10 h. To complete the reaction, the mixture is allowed to post-react for additional 10 h at 140° C. The reaction mixture is stripped with nitrogen and volatile compounds are removed in vacuo at 90° C. 730.0 g of a highly viscous light brown oil is obtained (saponification value: 1.7 mgKOH/g).

Example 4

Hexamethylene Diamine, Reacted with 0.25 Mole Caprolactone/Mole, Propoxylated with 60 Mole Propylene Oxide/Mole and Ethoxylated with 40 Mole Ethylene Oxide/Mol A 2 l autoclave is filled with 151.5 g hexamethylene diamine, reacted with 0.25 mole caprolactone/mole and propoxylated with 12 mole propylene oxide/mole (example 1 b) and 1.8 g potassium tert. butoxide. The mixture is heated to 110° C., and the vessel is purged three times with nitrogen. The vessel is heated to 140° C. and 502.0 g propylene oxide is added within 8 h. To complete the reaction, the mixture is allowed to post-react for additional 2 h at 140° C. 317.2 g ethylene oxide is added within 5 hours, followed by 5 hours post-reaction time. The reaction mixture is stripped with nitrogen and volatile compounds are removed in vacuo at 80° C. 960.0 g of a highly viscous light brown oil is obtained.

Example 5

Hexamethylene Diamine, Reacted with 1 Mole Caprolactone/Mole, Propoxylated with 12 Mole Propylene Oxide/Mole 5a—Hexamethylene Diamine, Reacted with 1 Mole Caprolactone/Mole In a 2.0 l four-neck vessel equipped with stirrer, reflux condenser, dropping funnel, thermometer, and nitrogen inlet 631.0 g hexamethylene diamine is placed and heated to 50° C. 20.8 g potassium methylate (30% in methanol) is added. 619.0 g caprolactone is added within 0.5 hour, the temperature is allowed to rise to 114° C. After complete addition of caprolactone, the reaction mixture is heated to 120° C. and is stirred for 2 hours at 120° C. $^1$H-NMR in MeOD indicates complete conversion of caprolactone. Volatile compounds are removed in vacuo (30 mbar) at 80° C. for 0.5 hours. 1240.0 g of an orange viscous oil is obtained.

5b—Hexamethylene Diamine, Reacted with 1 Mole Caprolactone/Mole, Propoxylated with 12 Mole Propylene Oxide/Mole A 2 l autoclave is filled with 190.0 g hexamethylene diamine, reacted with 1 mole caprolactone/mole (example 5a) and heated to 110° C. The vessel is purged three times with nitrogen. The vessel is heated to 140° C. and 572.4 g propylene oxide is added within 10 h. To complete the reaction, the mixture is allowed to post-react for additional 7 h at 140° C. The reaction mixture is stripped with nitrogen and volatile compounds are removed in vacuo at 90° C. 760.0 g of a highly viscous yellow oil is obtained (saponification value: 12.0 mgKOH/g).

Example 6

Hexamethylene Diamine, Reacted with 1 Mole Caprolactone/Mole, Propoxylated with 32 Mole Propylene Oxide/Mole A 2 l autoclave is filled with 94.0 g hexamethylene diamine, reacted with 1 mole caprolactone/mole (example 5a) and heated to 110° C. The vessel is purged three times with nitrogen. The vessel is heated to 140° C. and 758.9 g propylene oxide is added within 10 h. To complete the reaction, the mixture is allowed to post-react for additional 7 h at 140° C. The reaction mixture is stripped with nitrogen and volatile compounds are removed in vacuo at 90° C. 850.0 g of a highly viscous yellow oil is obtained (saponification value: 7.9 mgKOH/g).

Example 7

Hexamethylene Diamine, Reacted with 1 Mole Caprolactone/Mole, Propoxylated with 60 Mole Propylene Oxide/Mole A 2 l autoclave is filled with 139.1 g hexamethylene diamine, reacted with 1 mole caprolactone/mole and propoxylated with 12 mole propylene oxide/mole (example 6) and 0.94 g potassium tert. butoxide. The mixture is heated to 110° C., and the vessel is purged three times with nitrogen. The vessel is heated to 140° C. and 418.2 g propylene oxide is added within 5 h. To complete the reaction, the mixture is allowed to post-react for additional 7 h at 140° C. The reaction mixture is stripped with nitrogen and volatile compounds are removed in vacuo at 90° C. 556.0 g of a highly viscous brown oil is obtained (saponification value: 5.4 mgKOH/g).

Example 8

Hexamethylene Diamine, Reacted with 1 Mole Caprolactone/Mole, Propoxylated with 32 Mole Propylene Oxide/Mole and Ethoxylated with 32 Mole Ethylene Oxide/Mol A 2 l autoclave is filled with 231.8 g hexamethylene diamine, reacted with 1 mole caprolactone/mole and propoxylated with 12 mole propylene oxide/mole (example 5 b) and 1.5 g potassium tert. butoxide. The mixture is heated to 110° C., and the vessel is purged three times with nitrogen. The vessel is heated to 140° C. and 290.4 g propylene oxide is added within 4 h. To complete the reaction, the mixture is allowed to post-react for additional 2 h at 140° C. 352.4 g ethylene oxide is added within 7 hours, followed by 5 hours post-reaction time. The reaction mixture is stripped with nitrogen and volatile compounds are removed in vacuo at 80° C. 870.0 g of a highly viscous light brown oil is obtained.

Example 9

Hexamethylene Diamine, Reacted with 4 Mole Caprolactone/Mole, Propoxylated with 12 Mole Propylene Oxide/Mole 9a—Hexamethylene Diamine, Reacted with 4 Mole Caprolactone/Mole In a 2 l four-neck vessel equipped with stirrer, reflux condenser, dropping funnel, thermometer, and nitrogen inlet 232.4 g hexamethylene diamine and 19.1 g potassium methylate (30% in methanol) are placed and heated to 120° C. At this temperature 913.4 g caprolactone is added within 0.5 hour. After complete addition of caprolactone, the reaction mixture is stirred for 4 hours at 120° C. Volatile compounds are removed in vacuo (30 mbar) at 80° C. for 0.5 hours. $^1$H-NMR in MeOD indicates complete conversion of caprolactone. 1130.0 g of a light yellow oil is obtained.

9b—Hexamethylene Diamine, Reacted with 4 Mole Caprolactone/Mole, Propoxylated with 32 Mole Propylene Oxide/Mole A 2 l autoclave is filled with 402.0 g hexamethylene diamine, reacted with 4 mole caprolactone/mole (example 9a) and heated to 80° C. The vessel is purged three times with nitrogen. The vessel is heated to 140° C. and 486.8 g propylene oxide is added within 10 h. To complete the reaction, the mixture is allowed to post-react for additional 7 h at 140° C. The reaction mixture is stripped with nitrogen and volatile compounds are removed in vacuo at 80° C. 880.0 g of a highly viscous yellow oil is obtained (saponification value: 87.5 mgKOH/g).

Example 10

Hexamethylene Diamine, Reacted with 4 Mole Caprolactone/Mole, Propoxylated with 20 Mole Propylene Oxide/Mole A 2 l autoclave is filled with 96 g hexamethylene diamine, reacted with 4 mole caprolactone/mole (example 9a) and heated to 80° C. The vessel is purged three times with nitrogen. The vessel is heated to 140° C. and 193.7 g propylene oxide is added within 4 h. To complete the reaction, the mixture is allowed to post-react for additional 6 h at 140° C. The reaction mixture is stripped with nitrogen and volatile compounds are removed in vacuo at 80° C. 274.0 g of a highly viscous yellow oil is obtained (saponification value: 72.2 mgKOH/g).

Example 11

Hexamethylene Diamine, Reacted with 4 Mole Caprolactone/Mole, Propoxylated with 32 Mole Propylene Oxide/Mole A 2 l autoclave is filled with 96.0 g hexamethylene diamine, reacted with 4 mole caprolactone/mole (example 9a) and heated to 80° C. The vessel is purged three times with nitrogen. The vessel is heated to 140° C. and 310.4 g propylene oxide is added within 4 h. To complete the reaction, the mixture is allowed to post-react for additional 6 h at 140° C. The reaction mixture is stripped with nitrogen and volatile compounds are removed in vacuo at 80° C. 366.0 g of a highly viscous light yellow oil is obtained (saponification value: 56.9 mgKOH/g).

Example 12

N4 Amine (N,N-bis(3-aminopropyl)ethylene Diamine), Reacted with 2 Mole Caprolactone/Mole, Propoxylated with 12 Mole Propylene Oxide/Mole 12a—N4 Amine (N,N-bis(3-aminopropyl)ethylene Diamine), Reacted with 2 Mole Caprolactone/Mole In a 0.5 l four-neck vessel equipped with stirrer, reflux condenser, dropping funnel, thermometer, and nitrogen inlet 348.6 g N4 amine (N,N-bis(3-aminopropyl)ethylene diamine) and 13.4 g potassium methoxide (30% in methanol) are placed. 456.6 g caprolactone is added within 0.75 hours. Temperature of the reaction mixture rises during the addition of caprolactone to 110° C. After complete addition of caprolactone, the reaction mixture is heated to 120° C. and is stirred for 2 hours at 120° C. Volatile compounds are removed in vacuo (30 mbar) at 80° C. for 0.5 hours. $^1$H-NMR in MeOD indicates complete conversion of caprolactone. 801.0 g of a light yellow oil is obtained 12b—N4 Amine (N,N-Bis(3-Aminopropyl)Ethylene Diamine), Reacted with 2 Mole Caprolactone/Mole, Propoxylated with 12 Mole Propylene Oxide/Mole In a 2 l autoclave 296.0 g N4 amine (N,N-bis(3-aminopropyl)ethylene diamine), reacted with 2 mole caprolactone/mole (example 12a) is placed and heated to 140° C. The vessel is purged three times with nitrogen. 512.5 g propylene oxide is added within 8 h. To complete the reaction, the mixture is allowed to post-react for additional 5 h at 140° C. The reaction mixture is stripped with nitrogen and volatile compounds are removed in vacuo at 80° C. 798.0 g of a viscous light brown oil is obtained.

Example 13

N4 Amine (N,N-bis(3-aminopropyl)ethylene Diamine), Reacted with 2 Mole Caprolactone/Mole, Propoxylated with 64 Mole Propylene Oxide/Mole In a 2 l autoclave 217.6.0 g N4 amine (N,N-bis(3-aminopropyl)ethylene diamine), reacted with 2 mole caprolactone/mole, propoxylated with 12 mole propylene oxide/mole (example 12 b) and 1.3 g potassium tert. butoxide is placed and heated to 140° C. The vessel is purged three times with nitrogen. 606.3 g propylene oxide is added within 10 h. To complete the reaction, the mixture is allowed to post-react for additional 5 h at 140° C. The reaction mixture is stripped with nitrogen and volatile compounds are removed in vacuo at 80° C. 825.0 g of a viscous light brown oil is obtained.

Example 14

DETA (Bis(2-aminoethyl)amine), Reacted with 1.5 Mole Caprolactone/Mole, Propoxylated with 12 Mole Propylene Oxide/Mole 14a—DETA (Bis(2-aminoethyl)amine), Reacted with 1.5 Mole Caprolactone/Mole In a 1 l four-neck vessel equipped with stirrer, reflux condenser, dropping funnel, thermometer, and nitrogen inlet 309.5 g DETA (Bis(2-aminoethyl)amine) and 13.7 g potassium methoxide (30% in methanol) are placed. 513.6 g caprolactone is added within 0.75 hours. Temperature of the reaction mixture rises during the addition of caprolactone to 70° C. After complete addition of caprolactone, the reaction mixture is heated to 120° C. and is stirred for 2 hours at 120° C. Volatile compounds are removed in vacuo (30 mbar) at 80° C. for 0.5 hours. $^1$H-NMR in MeOD indicates complete conversion of caprolactone. 801.0 g of a light yellow oil is obtained 14b—DETA (bis(2-aminoethyl)amine), Reacted with 1.5 Mole Caprolactone/Mole, Propoxylated with 12 Mole Propylene Oxide/Mole In a 2 l autoclave 219.5 g DETA (Bis(2-aminoethyl) amine), reacted with 1.5 mole caprolactone/mole (example 14a) is placed and heated to 140° C. The vessel is purged three times with nitrogen. 557.6 g propylene oxide is added within 10 h. To complete the reaction, the mixture is allowed to post-react for additional 5 h at 140° C. The reaction mixture is stripped with nitrogen and volatile compounds are removed in vacuo at 80° C. 767.0 g of a viscous light brown oil is obtained.

Example 15

DETA (Bis(2-aminoethyl)amine), Reacted with 1.5 Mole Caprolactone/Mole, Propoxylated with 48 Mole Propylene Oxide/Mole In a 2 l autoclave 239.9 g DETA (Bis(2-aminoethyl) amine), reacted with 1.5 mole caprolactone/mole, propoxylated with 12 mole propylene oxide/mole (example 14 b) and 1.2 g potassium tert. butoxide are placed and heated to 140° C. The vessel is purged three times with nitrogen. 525.6 g propylene oxide is added within 8 h. To complete the reaction, the mixture is allowed to post-react for additional 5 h at 140° C. The reaction mixture is stripped with nitrogen and volatile compounds are removed in vacuo at 80° C. 770.0 g of a viscous light brown oil is obtained.

Example 16

1,3-Propane Diamine, Reacted with 1 Mole Caprolactone/Mole, Propoxylated with 12 Mole Propylene Oxide/Mole 16a—1,3-Propane Diamine, Reacted with 1 Mole Caprolactone/Mole In a 1 I four-neck vessel equipped with stirrer, reflux condenser, dropping funnel, thermometer, and nitrogen inlet 370.6 g 1,3-propane diamine and 15.7 g potassium methoxide (30% in methanol) are placed. 570.7 g caprolactone is added within 0.75 hours. Temperature of the reaction mixture rises during the addition of caprolactone to 60° C. After complete addition of caprolactone, the reaction mixture is heated to 120° C. and is stirred for 2 hours at 120° C. Volatile compounds are removed in vacuo (30 mbar) at 80° C. for 0.5 hours. $^1$H-NMR in MeOD indicates complete conversion of caprolactone. 935.0 g of a light yellow oil is obtained.

16 b—1,3-Propane Diamine, Reacted with 1 Mole Caprolactone/Mole, Propoxylated with 12 Mole Propylene Oxide/Mole In a 2 I autoclave 188.3 g 1,3-propane diamine, reacted with 1 mole caprolactone/mole (example 16a) is placed and heated to 140° C. The vessel is purged three times with nitrogen. 696.9 g propylene oxide is added within 12 h. To complete the reaction, the mixture is allowed to post-react for additional 5 h at 140° C. The reaction mixture is stripped with nitrogen and volatile compounds are removed in vacuo at 80° C. 881.0 g of a viscous light brown oil is obtained.

Example 17

1,3-Propane Diamine, Reacted with 1 Mole Caprolactone/Mole, Propoxylated with 32 Mole Propylene Oxide/Mole In a 2 I autoclave 309.8 g 1,3-propane diamine, reacted with 1 mole caprolactone/mole, propoxylated with 12 mole propylene oxide/mole (example 16 b) and 1.1 g potassium tert. butoxide are placed and heated to 140° C. The vessel is purged three times with nitrogen. 406.6 g propylene oxide is added within 6 h. To complete the reaction, the mixture is allowed to post-react for additional 5 h at 140° C. The reaction mixture is stripped with nitrogen and volatile compounds are removed in vacuo at 80° C. 718.0 g of a viscous light brown oil is obtained.

Example 18

MCDA (Methylcyclohexyl Diamine, Mixture of Isomers), Reacted with 1 Mole Caprolactone/Mole, Propoxylated with 12 Mole Propylene Oxide/Mole 18a—MCDA (Methylcyclohexyl Diamine, Mixture of Isomers), Reacted with 1 Mole Caprolactone/Mole In a 1 I four-neck vessel equipped with stirrer, reflux condenser, dropping funnel, thermometer, and nitrogen inlet 128.4 g MCDA (methylcyclohexyl diamine, mixture of isomers) and 4.0 g potassium methoxide (30% in methanol) are placed. 114.1 g caprolactone is added within 0.5 hour. Temperature of the reaction mixture rises during the addition of caprolactone to 60° C. After complete addition of caprolactone, the reaction mixture is heated to 120° C. and is stirred for 2 hours at 120° C. Volatile compounds are removed in vacuo (30 mbar) at 80° C. for 0.5 hours. $^1$H-NMR in MeOD indicates complete conversion of caprolactone. 242.0 g of a light yellow oil is obtained.

18b—MCDA (Methylcyclohexyldiamine, Mixture of Isomers), Reacted with 1 Mole Caprolactone/Mole, Propoxylated with 12 Mole Propylene Oxide/Mole In a 2 I autoclave 241.2 g MCDA (methylcyclohexyl diamine, mixture of isomers), reacted with 1 mole caprolactone/mole (example 18a) is placed and heated to 140° C. The vessel is purged three times with nitrogen. 348.5 g propylene oxide is added within 5 h. To complete the reaction, the mixture is allowed to post-react for additional 5 h at 140° C. The reaction mixture is stripped with nitrogen and volatile compounds are removed in vacuo at 80° C. 585.0 g of a viscous light brown oil is obtained.

Example 19

MCDA (Methylcyclohexyl Diamine, Mixture of Isomers), Reacted with 1 Mole Caprolactone/Mole, Propoxylated with 32 Mole Propylene Oxide/Mole In a 2 I autoclave 353.8 g MCDA (methylcyclohexyl diamine, mixture of isomers), reacted with 1 mole caprolactone/mole, propoxylated with 12 mole propylene oxide/mole (example 18 b) and 1.1 g potassium tert. butoxide are placed and heated to 140° C. The vessel is purged three times with nitrogen. 348.5 g propylene oxide is added within 6 h. To complete the reaction, the mixture is allowed to post-react for additional 5 h at 140° C. The reaction mixture is stripped with nitrogen and volatile compounds are removed in vacuo at 80° C. 700.0 g of a viscous light brown oil is obtained.

Example 20

Hexamethylene Diamine, Reacted with 1 Mole γ-Butyrolactone/Mole, Propoxylated with 12 Mole Propylene Oxide/Mole 20a—Hexamethylene Diamine, Reacted with 1 Mole γ-Butyrolactone/Mole In a 2.0 I four-neck vessel equipped with stirrer, reflux condenser, dropping funnel, thermometer, and nitrogen inlet 232.4 g hexamethylene diamine is placed and heated to 45° C. 6.7 g potassium methylate (30% in methanol) is added. 172.2 g γ-butyrolactone is added within 1 hour, the temperature is allowed to rise to 118° C. After complete addition of caprolactone, the reaction mixture is heated to 120° C. and is stirred for 2 hours at 120° C. $^1$H-NMR in MeOD indicates complete conversion of caprolactone. Volatile compounds are removed in vacuo (30 mbar) at 80° C. for 0.5 hours. 404.5 g of a light brown solid is obtained.

20b—Hexamethylene Diamine, Reacted with 1 Mole γ-Butyrolactone/Mole, Propoxylated with 12 Mole Propylene Oxide/Mole A 2 I autoclave is filled with 203.0 g hexamethylene diamine, reacted with 1 mole γ-butyrolactone/mole (example 20a) and 1.8 g potassium butoxide and heated to 110° C. The vessel is purged three times with nitrogen. The vessel is heated to 140° C. and 696.9 g propylene oxide is added within 15 h. To complete the reaction, the mixture is allowed to post-react for additional 10 h at 140° C. The reaction mixture is stripped with nitrogen and volatile compounds are removed in vacuo at 90° C. 899.0 g of a highly viscous brown oil is obtained.

Example 21

Hexamethylene Diamine, Reacted with 1 Mole γ-Butyrolactone/Mole, Propoxylated with 32 Mole Propylene Oxide/Mole A 2 l autoclave is filled with 224.8 g hexamethylene diamine, reacted with 1 mole γ-butyrolactone/mole and propoxylated with 12 mole propylene oxide/mole (example 20 b) and heated to 110° C. The vessel is purged three times with nitrogen. The vessel is heated to 140° C. and 290.4 g propylene oxide is added within 5 h. To complete the reaction, the mixture is allowed to post-react for additional 10 h at 140° C. The reaction mixture is stripped with nitrogen and volatile compounds are removed in vacuo at 90° C. 515.0 g of a viscous brown oil is obtained.

TABLE 5

| Polymer example | Polymer structure information |
|---|---|
| 1 | HMDA + 0.25 Caprolacton/mol + 12 PO/mol |
| 2 | HMDA + 0.25 Caprolacton/mol + 32 PO/mol |
| 3 | HMDA + 0.25 Caprolacton/mol + 60 PO/mol |
| 4 | HMDA + 0.25 Caprolacton/mol + 60 PO/mol + 40 EO/mol |
| 5 | HMDA + 1 Caprolacton/mol + 12 PO/mol |
| 6 | HMDA + 1 Caprolacton/mol + 32 PO/mol |
| 7 | HMDA + 1 Caprolacton/mol + 60 PO/mol |
| 8 | HMDA + 1 Caprolacton/mol + 32 PO/mol + 32 EO/mol |
| 9 | HMDA + 4 Caprolacton/mol + 12 PO/mol |
| 10 | HMDA + 4 Caprolacton/mol + 20PO/mol |
| 11 | HMDA + 4 Caprolacton/mol + 32 PO/Mol |
| 12 | N4 amin + 2 Caprolacton/mol + 12 PO/mol |
| 13 | N4 amin + 2 Caprolacton/mol + 64 PO/mol |
| 14 | DETA + 1.5 Caprolacton/mol + 12 PO/mol |
| 15 | DETA + 1.5 Caprolacton/mol + 48 PO/mol |
| 16 | 1,3-Propandiamin + 1 Caprolacton/mol + 12 PO/mol |
| 17 | 1,3-Propandiamin + 1 Caprolacton/mol + 32 PO/mol |
| 18 | MCDA + 1 Caprolacton/mol + 12 PO/mol |
| 19 | MCDA + 1 Caprolacton/mol + 32 PO/mol |
| 20 | HMDA + 1 γ-Butyrolactone/mol + 12 PO/mol |
| 21 | HMDA + 1 γ-Butyrolactone/mol + 32 PO/mol |

(note:
"γ-Butyrolactone" as e.g.in examples 20 and 21 of this table denotes "gamma-butyrolactone")

In the following examples showing application and other test results of certain inventive polymers, whenever "Polymer example(s)" and a number is mentioned, it is meant that the final product, i.e. the "alkoxylated polyamine" resulting is employed.

Polymer Biodegradability

Polymer biodegradation in wastewater was tested in triplicate using the OECD 301F manometric respirometry method. 30 mg/mL test substance is inoculated into wastewater taken from Mannheim Wastewater Treatment Plant and incubated in a closed flask at 25° C. for 28 days. The consumption of oxygen during this time is measured as the change in pressure inside the flask using an OxiTop C (WTW). Evolved $CO_2$ is absorbed using an NaOH solution. The amount of oxygen consumed by the microbial population during biodegradation of the test substance, after correction using a blank, is expressed as a % of the ThOD (Theoretical Oxygen Demand).

The biodegradation data of inventive polymers at 28 day of the OECD 301F test is summarized in Table 6.

TABLE 6

Polymer biodegradability

| Polymer Example | Polymer structure information | % biodegradation 28 d |
|---|---|---|
| 1 | HMDA + 0.25 Caprolacton/mol + 12 PO/mol | 37 |
| 2 | HMDA + 0.25 Caprolacton/mol + 32 PO/mol | 49 |
| 5 | HMDA + 1 Caprolacton/mol + 12 PO/mol | 50 |
| 6 | HMDA + 1 Caprolacton/mol + 32 PO/mol | 60 |
| 9 | HMDA + 4 Caprolacton/mol + 12 PO/mol | 75 |
| 10 | HMDA + 4 Caprolacton/mol + 20 PO/NH (20/Mol) | 72 |
| 11 | HMDA + 4 Caprolacton/mol + 32 PO/Mol | 74 |

Polymer Anti-Redeposition Performance in Laundry Detergents

The following liquid laundry detergent composition (Table 7) was used as base detergent to test polymer anti-redeposition performance. Polymer anti-redeposition performance were tested using the following conditions:

3000 ppm clay, 688 ppm base detergent/25° C./1 mM hardness/19.6 ppm polymer.

TABLE 7

Liquid laundry base detergent for polymer anti-redeposition and cleaning test.

| Raw Material | Comp. 6 % wt |
|---|---|
| $C_{10}$-$C_{16}$ Alkyl Sulfate | 7.7 |
| Linear alkylbenzene sulfonate | 8.9 |
| Amine oxide | 0.6 |
| $C_{12}$-$C_{14}$ alkyl ethoxylate (EO9) | 0.3 |
| $C_{14}$-$C_{15}$ alkyl ethoxylate (EO7) | 7.5 |
| Citric acid | 1.8 |
| Mannanase | 0.002 |
| Amylase | 0.007 |
| Protease | 0.072 |
| Sodium tetraborate | 1.5 |
| Calcium/sodium formate | 0.07 |
| Sodium/Calcium Chloride | 0.24 |
| Alkoxylated polyamine of the present invention | 1.0 |
| DTPA | 0.5 |
| Fluorescent Brightener[a] | 0.08 |
| Ethanol | 1.7 |
| propylene glycol | 3.1 |
| Sorbitol | 0.06 |
| Monoethanolamine | 2.7 |
| DETA | 0.05 |
| Antioxidant [b] | 0.04 |
| NaOH | 0.05 |
| Sodium cumene sulfonate (NaCS) | 1.3 |
| Hydrogenated Castor Oil | 0.1 |
| Aesthetic dye | 0.01 |
| Perfume and Perfume microcapsules | 0.6 |
| Silicone antifoam[c] | 0.21 |
| Phenyloxyethanol | 0.001 |
| Hueing dye | 0.026 |
| Water & miscellaneous | balance |

[a]Fluorescent Brightener is disodium 4,4'-bis{[4-anilino-6-morpholino-s-triazin-2-yl]-amino}-2,2'-stilbenedisulfonate or 2,2'-([1,1'-Biphenyl]-4,4'-diyldi-2,1-ethenediyl)bis-benzenesulfonic acid disodium salt.

[b] 3,5-bis(1,1-dimethylethyl)-4-hydroxybenzenepropanoic acid, methyl ester [6386-38-5]

[c]Dow Corning supplied antifoam blend 80-92% ethylmethyl, methyl(2-phenyl propyl) siloxane; 5-14% MQ Resin in octyl stearate a 3-7% modified silica.

Test Preparation:

The following fabrics are provided for the whiteness benefit test:

NA Polyester: PW19, available from Empirical Manufacturing Company (Cincinnati, Ohio, Knitted Cotton 1: Test fabrics, Inc 403 cotton interlock knit tubular CW120, available from Empirical Manufacturing Company (Cincinnati, Ohio, USA).

Polycotton

"Washed and FE Treated" fabrics were prepared according to the following method: 400 g fabrics are washed in a WE Miniwasher Electrolux EWC1350 (3.5 litre water) twice using the short program (45-minute wash cycle followed by three rinse cycles; total program is 90 minutes) at 60° C. with 18.6 g Ariel™ Compact powder detergent, twice using the short program, at 60° C. nil detergent, and then three times using the short program at 40° C. with 8.2 g Lenor™ Concentrate (a fabric enhancer) into each main wash. Fabrics are then dried in a tumble dryer on extra dry until dry.

"Washed" fabrics were prepared according to the following method: 400 g fabrics are washed in a WE Miniwasher Electrolux EWC 1350 (3.5 litre water) twice using the short program (45-minute wash cycle followed by three rinse cycles; total program is 90 minutes) at 60° C. with 18.6 g Ariel™ Compact powder detergent and twice using the short program, at 60° C. nil detergent. Fabrics are then dried in a tumble dryer on extra dry until dry.

Test Method:

Four fabric samples are prepared: Polycotton, washed; Knitted Cotton, washed; NA Polyester washed and FE treated, Knitted washed and FE treated.

Each sample is run in a 96 well plate simulated washing system that uses magnetized bearings to simulate the agitation of a typical full scale washing machine according to the following conditions: 750 ppm detergent concentration, 150 μL water per well, 25° C., water hardness of 1.0 mM (2:1 Ca+2: Mg+2 molar ratio), wash pH of 8.3, 3000 ppm Arizona test dust (supplied by PTI, Powder Technology Inc).

Each polymer listed in table 5 is added at 15 ppm of the wash solution. Each fabric is washed for 60 minutes and dried in the dark under ambient conditions. For each wash condition, there are two 96 well plates, and eight internal replicates per 96 well plate, for a total of 16 replicates per wash condition.

When the samples are dry, L*, a*, b* and CIE WI are measured on each 96 well plate spot using a Spectrolino imaging system (Gretag Macbeth, Spectro Scan 3.273). For each treatment, the average CIE WI is determined. Delta CIE WI, as reported in Table below, is the difference of the average CIE WI of the sample vs. the average CIE WI of a control sample without the tested polymer.

The whiteness index (WI-index) as determined on several different fibre materials (see following table) was calculated as follow:

"Comparable scaling indicator" (for example listed)=(Sum (WI all fabric tested with technology A)×100)/Sum (all WI fabric tested with nil technology) with this comparison being set at "100" for the test using no graft polymer.

For the whiteness index, the CIE whiteness index formula was used and delta WI was calculated as follows: delta WI on a substrate=WI technology−WI nil.

The results are shown in Table 8, inventive polymers can deliver clear anti-redeposition performance.

TABLE 8

Polymer anti-redeposition performance

| Polymer Example | Add. ppm | Delta CIE WI vs nil polymer: Polycotton washed | NA Polyester washed and FE treated | cotton washed and FE treated | cotton washed | Average | Comparative scaling indicator |
|---|---|---|---|---|---|---|---|
| Nil polymer | | ref | ref | ref | ref | ref | 100 |
| 1 | 19.6 | 6.1 | 4.8 | 9.6 | 2.4 | 5.7 | 135 |
| 2 | 19.6 | 5.8 | 6.1 | 11.3 | 1.7 | 6.2 | 138 |
| 3 | 19.6 | 7.0 | 2.8 | 10.4 | 2.2 | 5.6 | 134 |
| 4 | 19.6 | 8.8 | 4.7 | 9.7 | 4.6 | 7.0 | 271 |
| 5 | 19.6 | 5.9 | 2.1 | 9.1 | 5.5 | 5.6 | 131 |
| 6 | 19.6 | 9.5 | 3.1 | 14.5 | 7.3 | 8.6 | 147 |
| 7 | 19.6 | 6. | 5.2 | 9.4 | 4.0 | 6.3 | 139 |
| 8 | 19.6 | 7.1 | 3.5 | 9.1 | 3.4 | 5.8 | 242 |
| 9 | 19.6 | 4.4 | 3.1 | 7.9 | −0.6 | 3.7 | 122 |
| 10 | 19.6 | 5.1 | 2.7 | 6.3 | 2.0 | 4.0 | 198 |
| 11 | 19.6 | 6.5 | 5.9 | 10.2 | 4.2 | 6.7 | 129 |
| 12 | 19.6 | 6.1 | 3.6 | 11.4 | 7.2 | 7.1 | 199 |
| 13 | 19.6 | 7.5 | 5.4 | 13.2 | 6.6 | 8.2 | 215 |
| 14 | 19.6 | 4.3 | 1.7 | 5.1 | 4.8 | 4.0 | 153 |
| 15 | 19.6 | 8.0 | 5.2 | 11.6 | 8.5 | 8.3 | 211 |
| 16 | 19.6 | 5.4 | 4.3 | 9.0 | 2.4 | 5.3 | 174 |
| 17 | 19.6 | 7.6 | 5.5 | 14.1 | 4.8 | 8.0 | 212 |
| 20 | 19.6 | 6.1 | 2.7 | 8.5 | 3.1 | 5.1 | 131 |
| 21 | 19.6 | 4.7 | 5.6 | 9.2 | 4.8 | 6.1 | 137 |

Polymer Cleaning Performance in Laundry Detergent

Polymer cleaning performance in laundry detergent were carried out with the formulation stated Table 7 and the washing conditions for single wash cycle performance may be summarized as follows:

Machine: Launder-o-meter

Washing liquor 500 mL

Washing time 30 minutes

Washing temperature 25° C.

Detergent concentration 0.688 g/L

Water hardness 1 mmol/L; (Ca:Mg):HCO3 (4:1):8

Ballast: white cotton fabric (Cotton interlock knit tubula from CFT) 7×21 cm

Soiled fabrics: PC-S 94, WFK 20D, PC-S 132 from CFT, Greasy Blue 12 Bacon Grease, Greasy Blue 12 Pork Fat from CFT After the one cycle, soiled fabrics were twice rinsed with water, followed by shortly spin-drying and drying at room temperature over a period of 12 hours.

To evaluate the primary detergency of different stains, different soiled fabrics were determined before and after washing using soil removal index (SRI) formula from ASTM D4265. For obtaining the reflectance values for the respective fabric both before and after washing using a Spectrolino imaging system (Gretag Macbeth, Spectro Scan 3.273), an average of 6 different measuring points were taken each before and after washing. Higher delta reflectance values demonstrate a better primary detergency.

ASTM D4265-14: Evaluation of Stain Removal Performance in Home Laundry Stain Removal Index=SRI $$SRI=100\times(((\text{delta } E^*(\text{before wash-unstained})-\text{delta } E^*(\text{after wash-unstained}))/\text{delta } E^*(\text{before wash-unstained})))$$

$$\text{delta } E^*=((\text{delat } L^*)^2+(\text{delta } a^*)^2+(\text{delta } b^*)^2)^{1/2}$$

$$\text{Average delta SRI}=(\text{sum delta SRI all stains})/\text{number of stains}$$

The cleaning performance of inventive polymers is summarized in Table 9. Inventive polymers can deliver clear improvement on stain removal, especially on stains that contain sebum (PCS94, WFK 20D and PCS132).

TABLE 9

Polymer cleaning performance.

| Polymer Example used as additive | Additive_ppm | Delta SRI PCS 94 | Delta SRI WFK20D | Delta SRI PCS132 | average delta SRI |
|---|---|---|---|---|---|
| 1 | 19.6 | 7.9 | 4.9 | 5.7 | 6.2 |
| 2 | 19.6 | 10.0 | 5.5 | 7.8 | 7.8 |
| 3 | 19.6 | 9.1 | 6.7 | 6.9 | 7.6 |
| 4 | 7.8 | 2.8 | 3.5 | 4.3 | 3.5 |
| 5 | 19.6 | 4.1 | 1.0 | 3.1 | 2.7 |
| 6 | 19.6 | 2.3 | 7.3 | 5.1 | 4.9 |
| 7 | 19.6 | 5.6 | 6.7 | 4.1 | 5.5 |
| | | | | | 1.7 |
| 9 | 19.6 | 3.4 | 3.8 | 1.4 | 2.9 |
| 10 | 19.6 | 3.8 | 3.3 | 7.1 | 4.7 |
| 11 | 19.6 | 0.9 | 6.4 | 4.0 | 3.8 |
| 12 | 19.6 | 5.0 | 5.2 | 1.0 | 3.7 |
| 13 | 19.6 | 7.4 | 4.1 | 5.6 | 5.7 |
| 15 | 19.6 | 4.1 | 6.4 | 4.7 | 5.1 |
| 20 | 19.6 | 6.2 | 4.1 | 0.9 | 3.7 |
| 21 | 19.6 | 6.8 | 7.2 | 3.5 | 5.8 |

Polymer Whiteness Performance

Whiteness maintenance, also referred to as whiteness preservation, is the ability of a detergent to keep white items from whiteness loss when they are washed in the presence of soils. White garments can become dirty/dingy looking over time when soils are removed from dirty clothes and suspended in the wash water, then these soils can re-deposit onto clothing, making the clothing less white each time they are washed.

The whiteness benefit of polymers of the present disclosure is evaluated using automatic Tergotometer with 10 pots for laundry formulation testing.

SBL2004 test soil strips supplied by WFK Testgewebe GmbH are used to simulate consumer soil levels (mix of body soil, food, dirt etc.). On average, every 1 SBL2004 strip is loaded with 8 g soil. The SBL2004 test soil strips were cut into 5x5 cm squares for use in the test.

White Fabric swatches of Table 10 below purchased from WFK Testgewebe GmbH are used as whiteness tracers. Before wash test, L, a, b values of all whiteness tracers are measured using Konica Minolta CM-3610D spectrophotometer.

TABLE 10

| Code | Fiber Content | % Fiber Content | Fabric Construction | Size | WFK Code |
|---|---|---|---|---|---|
| CK | Cotton | 100 | Weft Knit | (5 × 5 cm) | 19502_5 × 5_stamped |
| PC | Polyester/cotton | 65/35 | Weave | (5 × 5 cm) | 19503_5 × 5_stamped |
| PE | Polyester | 100 | Weft Knit | (5 × 5 cm) | 19508_5 × 5_stamped |
| PS | Polyester/Spandex ™ | 95/5 | Weft Knit | (5 × 5 cm) | 19507_5 × 5_stamped |

Additional ballast (background fabric swatches) are also used to simulate a fabric load and provide mechanical energy during the real laundry process. Ballast loads are comprised of cotton and polycotton knit swatches at 5x5 cm size. 4 cycles of wash are needed to complete the test:

Cycle 1: Desired amount of detergent is fully dissolved by mixing with 1 L water (at defined hardness) in each tergotometer port. 60 grams of fabrics, including whiteness tracers (4 types, each with 4 replicates), 21 pieces 5x5 cm SBL2004, and ballast are washed and rinsed in the tergotometer pot under defined conditions.

In the test of water-soluble unit dose composition, wash concentration is 2000 ppm. Additional 47 ppm PVOH film is also added to the tergotometer pot. The wash temperature is 30° C., water hardness is 20 gpg.

Cycle 2: The whiteness tracers and ballast from each pot are then washed and rinsed again together with a new set of SBL2004 (5x5 cm, 21 pieces) follow the process of cycle 1. All other conditions remain same as cycle 1.

Cycle 3: The whiteness tracers and ballast from each pot are then washed and rinsed again together with a new set of SBL2004 (5x5 cm, 21 pieces) follow the process of cycle 1. All other conditions remain same as cycle 1.

Cycle 4: The whiteness tracers and ballast from each port are then washed and rinsed again together with a new set of SBL2004 (5x5 cm, 21 pieces) follow the process of cycle 1. All other conditions remain same as cycle 1.

After Cycle 4, all whiteness tracers & ballast are tumbled dried between 60-65° C. until dry, the tracers are then measured again using Konica Minolta CM-3610D spectrophotometer. The changes in Whiteness Index (ΔWI(CIE)) are calculated based on L, a, b measure before and after wash:

$$\Delta WI(CIE)=WI(CIE)(\text{after wash})-WI(CIE)(\text{before wash}).$$

Water soluble unit dose detergent composition E and F below are prepared by traditional means known to those of ordinary skill in the art by mixing the listed ingredients (Table 11).

The whiteness maintenance of the inventive and comparative polymers are evaluated according to the method for evaluating whiteness performance of polymers by directly comparing the whiteness performance of reference composition E and test composition F. ΔWI(CIE) of composition F vs composition E is reported in bottom Table 11 as an indication of polymer whiteness performance benefit. Inventive polymer can deliver strong whiteness benefit.

TABLE 11

| Ingredients | E (Reference composition) | F (Test composition: reference composition + Inventive or comparative polymer) |
|---|---|---|
| LAS (wt %) | 23.29 | 23.29 |
| AES (wt %) | 11.99 | 11.99 |
| AE NI (wt %) | 1.92 | 1.92 |
| Suds Suppressor (wt %) | 0.25 | 0.25 |
| Polymer Example 7 (wt %) | 0.00 | 5.53 |
| DTPA (wt %) | 0.49 | 0.49 |
| HEDP (wt %) | 2.12 | 2.12 |
| Monoethanolamine (wt %) | 7.68 | 7.68 |
| 1,2 PropaneDiol (wt %) | 8.52 | 8.52 |
| DiPropyleneGlycol (wt %) | 1.53 | 1.53 |
| Sodium Bisulphite (wt %) | 0.17 | 0.17 |
| $KSO_3$ (wt %) | 0.37 | 0.37 |
| $MgCl_2$ (wt %) | 0.30 | 0.30 |
| Citric Acid (wt %) | 0.66 | 0.66 |
| Fatty Acid (wt %) | 1.53 | 1.53 |
| Glycerine (wt %) | 4.49 | 4.49 |
| Brightener (wt %) | 0.37 | 0.37 |
| Blue dye (wt %) | 0.0059 | 0.0059 |
| Enzyme (including Protease, Amylase, and Mannanase) (wt %) | 0.0657 | 0.0657 |
| Preservative (wt %) | 0.009 | 0.009 |
| Hydrogenated castor oil (wt %) | 0.09 | 0.09 |
| Perfume (wt %) | 2.17 | 2.17 |
| Hueing Dye (wt %) | 0.053 | 0.053 |
| Water/minors (wt %) | Balance | Balance |
| ΔWI(CIE) vs Reference (on PE: 100% Polyester Knit) | Reference | +5.3 |

Polymer Suds Mileage Performance in Hand Dish Detergent

Polymer suds mileage performance were evaluated using the following method for evaluating suds mileage of hand dish composition:

The objective of the Suds Mileage Index test is to compare the evolution over time of suds volume generated for different test formulations at specified water hardness, solution temperatures and formulation concentrations, while under the influence of periodic soil injections. Data are compared and expressed versus a reference composition as a suds mileage index (reference composition has suds mileage index of 100). The steps of the method are as follows:

1) A defined amount of a test composition, depending on the targeted composition concentration (0.12 wt %), is dispensed through a plastic pipette at a flow rate of 0.67 mL/sec at a height of 37 cm above the bottom surface of a sink (dimension: 300 mm diameter and 288 mm height) into a water stream (water hardness: 15 gpg, water temperature: 35° C.) that is filling up the sink to 4 L with a constant pressure of 4 bar.
2) An initial suds volume generated (measured as average foam height X sink surface area and expressed in $cm^3$) is recorded immediately after end of filling.
3) A fixed amount (6 mL) of soil is immediately injected into the middle of the sink.
4) The resultant solution is mixed with a metal blade (10 cm×5 cm) positioned in the middle of the sink at the air liquid interface under an angle of 45 degrees rotating at 85 RPM for 20 revolutions.
5) Another measurement of the total suds volume is recorded immediately after end of blade rotation.
6) Steps 3-5 are repeated until the measured total suds volume reaches a minimum level of 400 $cm^3$. The amount of added soil that is needed to get to the 400 $cm^3$ level is considered as the suds mileage for the test composition.
7) Each test composition is tested 4 times per testing condition (i.e., water temperature, composition concentration, water hardness, soil type).
8) The average suds mileage is calculated as the average of the 4 replicates for each sample.
9) Calculate a Suds Mileage Index by comparing the average mileage of a test composition sample versus a reference composition sample. The calculation is as follows:

$$\text{Suds Mileage Index} = \frac{\text{Average number of soil } \textit{additioin} \text{ of test composition}}{\text{Average number of soil addition of reference composition}} \times 100$$

Soil composition is produced through standard mixing of the components described in Table 12.

TABLE 12

| Greasy Soil | |
|---|---|
| Ingredient | Weight % |
| Crisco Oil | 12.730 |
| Crisco shortening | 27.752 |
| Lard | 7.638 |
| Refined Rendered Edible Beef Tallow | 51.684 |
| Oleic Acid, 90% (Techn) | 0.139 |
| Palmitic Acid, 99+% | 0.036 |
| Stearic Acid, 99+% | 0.021 |

Polymer Performance in Hand Dish Detergent

Hand dish detergent composition below are prepared by traditional means known to those of ordinary skill in the art by mixing the listed ingredients. The impact of inventive polymers on suds mileage are evaluated by comparing the suds mileage of formulation A (Reference) and B (Reference with inventive polymers) in Table 13. The suds mileage performance is evaluated using method for evaluating suds mileage of hand dish compositions described herein, and Suds Mileage Index is reported in Table 14.

TABLE 13

| Ingredient | A (Reference composition) | B (Test composition: Reference with inventive polymers) |
|---|---|---|
| | % by weight of the composition | |
| NaCl | 0.9 | 0.9 |
| Polypropylene glycol (mw 2000) | 0.809 | 0.809 |
| Ethanol | 1.7 | 1.7 |
| mixture of 2-methylcyclohexane-1,3-diamine, 4-methylcyclohexane-1,3-diamine | 0.125% | 0.125% |
| Magnesium sulfate heptahydrate | 0.04286 | 0.04286 |
| C12-13 AE0.6S anionic surfactant | 18.61 | 18.61 |
| C12-14 dimethyl amine oxide | 6.65 | 6.65 |
| BIT | 0.0045 | 0.0045 |
| Phenoxyethanol | 0.08 | 0.08 |
| NaOH | 0.24 | 0.24 |
| Perfume | 0.195 | 0.195 |
| Yellow Dye | 0.004 | 0.004 |
| Blue Dye | 0.00165 | 0.00165 |
| Inventive Polymer Examples | — | 1 |
| Water | Balance | Balance |
| pH (as 10 w/v % product concentration in water) | 9.0 | 9.0 |

As indicated in Table 14, inventive polymers can deliver clear suds mileage benefit.

TABLE 14

| Polymer performance in hand dish detergent | |
|---|---|
| Inventive Polymer | Suds mileage index vs A (Ref) |
| 1 | 110 |
| 9 | 104 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

The invention claimed is:

1. An alkoxylated polyamine of the general formula (I)

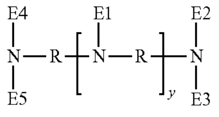

(I)

in which the variables are each defined as follows:

R represents identical or different, linear or branched $C_2$-$C_{12}$-alkylene radicals or an etheralkyl unit of the following formula (III):

$$-R^{10}-(O-R^{11})_d-O-R^{12}- \quad (III)$$

in which the variables are each defined as follows:

$R^{10}$, $R^{11}$, $R^{12}$ represent identical or different, linear or branched $C_2$-$C_6$-alkylene radicals and d is an integer having a value in the range of 0 to 50; or a cyclic alkylene-structure of Cs to Cs, optionally bearing 0 to 3 $C_1$ to $C_3$-alkyl groups, with the amine-groups being directly attached to the cyclic structure or linked via a further methylene-group, y is an integer having a value in the range of 0 to 3; and wherein y=0 when R is a cyclic alkylene, E1, E2 and E4 represent an identical or different residue according to formula (IIa) or an identical or different residue according to formula (IIb), wherein the residue according to formula (IIa) is an alkylenoxy unit defined as follows (IIa)

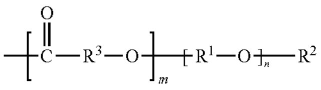

in which the variables are each defined as follows:

$R^1$ represents $C_2$-$C_{22}$-(1,2-alkylene) radicals;

$R^2$ represents hydrogen and/or $C_1$-$C_{10}$-alkyl and/or $C_7$-$C_{10}$-aralkyl;

$R^3$ represents linear or branched $C_1$-$C_{22}$-alkylene radicals;

m is an integer having a value of at least 1 to 10;

n is an integer having a value of at least 5 to 100;

and wherein $R^1$ is derived from greater than 50 wt % $C_3$ and/or $C_{4\ 1,2}$-alkylene radicals and wherein the residue according to formula (IIb) is an alkylenoxy unit defined as follows $$-(R1-O)_n-R^2 \quad (IIb)$$

in which the variables are defined as follows:

$R^1$ represents $C_2$-$C_{22}$-1,2-alkylene radicals;

$R^2$ represents hydrogen and/or $C_1$-$C_{10}$-alkyl and/or $C_7$-$C_{10}$-aralkyl;

n is an integer having a value of at least 5 to 100;

and wherein $R^1$ is derived from greater than 50 wt % $C_3$ and/or $C_4$ 1,2-alkylene radicals, E3 is hydrogen in case E2 is a residue according to formula (IIa) or E3 is a residue according to formula (IIb);

E5 is hydrogen in case E4 is a residue according to formula (IIa) or E5 is a residue according to formula (IIb); and/or wherein 5 to 100% of the total amount of E2 and E4 is a residue according to formula (IIa) and 50 to 100% of the total amount of E1 is a residue according to formula (IIb).

2. The alkoxylated polyamine according to claim 1, wherein at least one of $R^{10}$, $R^{11}$, or $R^{12}$is a cyclic alkylene-structure of Cs to Cs optionally bearing 0 to 3 $C_1$ to $C_3$-alkyl groups.

3. The alkoxylated polyamine according to claim 2, wherein the $C_1$ to $C_3$-alkyl groups comprise a methyl group.

4. The alkoxylated polyamine according to claim 2, wherein a least one of $R^{10}$, $R^{11}$ or $R^{12}$ is a cyclic alkylene-structure of $C_6$ comprising a methyl group, with the amine-groups being directly attached to the cyclic alkylene structure or linked via a further methylene-group.

5. The alkoxylated polyamine according to claim 1, wherein R represents identical or different, linear or branched $C_2$-$C_{12}$-alkylene radicals, wherein R is ethylene, propylene, hexamethylene or cyclic $C_6$-alkyl, the latter bearing optionally one and up to 3 methyl-group(s).

6. The alkoxylated polyamine according to claim 1, wherein within formulas (IIa) and/or (IIb) the variables are each defined as follows:

$R^1$ represents 1,2-ethylene, 1,2-propylene or 1,2-butylene; and/or $R^2$ represents hydrogen and/or $C_1$-$C_4$-alkyl; and/or $R^3$ represents linear or branched $C_2$-$C_{10}$-alkylene radicals; and/or m is an integer having a value in the range of 1 to 5; and/or n is an integer having a value in the range of 5 to 40; and/or wherein 80 to 100% of the total amount of E2 and E4 is a residue according to formula (IIa) and 80 to 100% of the total amount of E1 is a residue according to formula (IIb).

7. The alkoxylated polyamine according to claim 1, wherein the weight average molecular weight (Mw) of the polyamine backbone lies in the range of 50 to 2000 g/mol.

8. The alkoxylated polyamine according to claim 1, wherein y is an integer having a value in the range of 0 to 10;

R represents identical or different, linear or branched $C_2$-$C_{12}$-alkylene radicals or an etheralkyl unit according to formula (III), wherein d is from 1 to 5, and $R^{10}$, $R^{11}$, R 12 are independently selected from linear or branched $C_3$ to $C_4$ alkylene radicals.

9. The alkoxylated polyamine according to claim 8, wherein $R^1$ represents 1,2-ethylene; 1,2-propylene; and/or $C_4$-1,2-alkylene;

$R^2$ represents hydrogen and/or $C_1$-$C_4$-alkyl;

$R^3$ represents linear or branched $C_2$-$C_{10}$-alkylene radicals;

m is an integer having a value in the range of 1 to 5;

n is an integer having a value in the range of 8 to 40; and y is an integer having a value in the range of 1 to 10;

wherein $R^1$ is derived from greater than 50 wt % $C_3$ and/or $C_4$-1,2-alkylene radicals, and wherein 50 to 100% of the total amount of E2 and E4 is a residue according to formula (IIa) and 80 to 100% of the total amount of E1 is a residue according to formula (IIb).

10. The alkoxylated polyamine according to claim 8, wherein

R is ethylene or propylene;

$R^1$ represents 1,2-ethylene, 1,2-propylene and/or $C_4$-1,2-alkylene $R^2$ represents hydrogen;

$R^3$ represents linear or branched $C_2$-$C_5$-alkylene radicals;

m is an integer having a value in the range of 1 to 3;

n is an integer having a value in the range of 10 to 25; and y is an integer having a value in the range of 2 to 4;

wherein $R^1$ is derived from greater than 50 wt % $C_3$ and/or $C_4$-1,2-alkylene radicals, and wherein 90 to 100% of the total amount of E2 and E4 is a residue according to formula (IIa) and 90 to 100% of the total amount of E1 is a residue according to formula (IIb).

* * * * *